(12) United States Patent
Matsumura et al.

(10) Patent No.: US 11,564,211 B2
(45) Date of Patent: Jan. 24, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 86 days.

(21) Appl. No.: 16/762,093

(22) PCT Filed: Nov. 8, 2017

(86) PCT No.: PCT/JP2017/040333
§ 371 (c)(1),
(2) Date: May 6, 2020

(87) PCT Pub. No.: WO2019/092823
PCT Pub. Date: May 16, 2019

(65) Prior Publication Data
US 2020/0351863 A1 Nov. 5, 2020

(51) Int. Cl.
*H04W 72/04* (2009.01)
*H04B 1/713* (2011.01)
(Continued)

(52) U.S. Cl.
CPC ........ *H04W 72/0413* (2013.01); *H04B 1/713* (2013.01); *H04L 5/0051* (2013.01);
(Continued)

(58) Field of Classification Search
CPC ......... H04W 72/0413; H04W 72/0453; H04W 72/1263; H04W 72/04; H04W 72/12;
(Continued)

(56) References Cited

U.S. PATENT DOCUMENTS

2018/0124815 A1* 5/2018 Papasakellariou ........................... H04W 72/0446
2018/0167965 A1* 6/2018 Wang ................ H04W 72/0413
(Continued)

FOREIGN PATENT DOCUMENTS

WO 2019/032741 A1 2/2019

OTHER PUBLICATIONS

R1-1718307 (Year: 2017).*
(Continued)

*Primary Examiner* — Yu-Wen Chang
(74) *Attorney, Agent, or Firm* — Osha Bergman Watanabe & Burton LLP

(57) ABSTRACT

To improve utilization efficiency of radio resources in a case that uplink control channels of a plurality of user terminals having different durations and/or starting symbols are multiplexed in the same slot. A user terminal of the present invention includes a transmitting section that transmits uplink control information (UCI) by using an uplink control channel, and a control section that controls a hopping timing of a frequency resource to which the uplink control channel is mapped, based on whether an index of a starting symbol of the uplink control channel is an even number or an odd number and a duration of the uplink control channel.

3 Claims, 22 Drawing Sheets

EVEN-NUMBER TABLE

| STARTING SYMBOL | DURATION | FREQUENCY HOPPING | OCC |
|---|---|---|---|
| EVEN NUMBER | 14 | 7,7 | 3 |
| EVEN NUMBER | 13 | 7,6 | 3 |
| EVEN NUMBER | 12 | 6,6 | 3 |
| EVEN NUMBER | 11 | 6,5 | 2 |
| EVEN NUMBER | 10 | 5,5 | 2 |
| EVEN NUMBER | 9 | 5,4 | 2 |
| EVEN NUMBER | 8 | 4,4 | 2 |
| EVEN NUMBER | 7 | 4,3 | 1 |
| EVEN NUMBER | 6 | 3,3 | 1 |
| EVEN NUMBER | 5 | 3,2 | 1 |
| EVEN NUMBER | 4 | 2,2 | 1 |

ODD-NUMBER TABLE

| STARTING SYMBOL | DURATION | FREQUENCY HOPPING | OCC |
|---|---|---|---|
| ODD NUMBER | 14 | 7,7 | 3 |
| ODD NUMBER | 13 | 6,7 | 3 |
| ODD NUMBER | 12 | 6,6 | 3 |
| ODD NUMBER | 11 | 5,6 | 2 |
| ODD NUMBER | 10 | 5,5 | 2 |
| ODD NUMBER | 9 | 4,5 | 2 |
| ODD NUMBER | 8 | 4,4 | 2 |
| ODD NUMBER | 7 | 3,4 | 1 |
| ODD NUMBER | 6 | 3,3 | 1 |
| ODD NUMBER | 5 | 2,3 | 1 |
| ODD NUMBER | 4 | 2,2 | 1 |

(51) Int. Cl.
  *H04L 5/00*    (2006.01)
  *H04L 5/10*    (2006.01)
  *H04W 72/12*   (2009.01)

(52) U.S. Cl.
  CPC .............. *H04L 5/0082* (2013.01); *H04L 5/10* (2013.01); *H04W 72/0453* (2013.01); *H04W 72/1263* (2013.01)

(58) Field of Classification Search
  CPC ....... H04B 1/713; H04B 1/715; H04L 5/0051; H04L 5/0082; H04L 5/10
  See application file for complete search history.

(56) References Cited

U.S. PATENT DOCUMENTS

| | | | |
|---|---|---|---|
| 2018/0324787 A1* | 11/2018 | Yin | H04W 72/0413 |
| 2019/0045498 A1* | 2/2019 | Huang | H04W 72/0413 |
| 2019/0052422 A1 | 2/2019 | Yin et al. | |
| 2019/0222254 A1* | 7/2019 | Kim | H04L 5/0094 |
| 2020/0052835 A1* | 2/2020 | Xiong | H04L 5/0007 |
| 2020/0107317 A1* | 4/2020 | Ryu | H04W 72/0413 |
| 2021/0044409 A1* | 2/2021 | Davydov | H04W 24/10 |
| 2021/0143948 A1* | 5/2021 | Choi | H04L 5/0012 |

OTHER PUBLICATIONS

R1-1718308 (Year: 2017).*
R1-1718821 (Year: 2017).*
62538544,Specification (Year: 2017).*
62575540,Specification (Year: 2017).*
Extended European Search Report issued in counterpart European Patent Application No. 17931719.3, dated May 31, 2021 (10 pages).
Ericsson; "On the Design of Long PUCCH for 1-2 bits UCI"; 3GPP TSG-RAN WG1 Meeting#90, R1-1714422; Prague, Czech Republic; Aug. 21-25, 2017 (5 pages).
NTT DOCOMO, Inc.; "Long-PUCCH for UCI of up to 2 bits"; 3GPP TSG RAN WG1 Meeting 90bis, R1-1718210; Prague, CZ; Oct. 9-13, 2017 (9 pages).
International Search Report issued in PCT/JP2017/040333 dated Jan. 30, 2018 (1 page).
Written Opinion of the International Searching Authority issued in PCT/JP2017/040333 dated Jan. 30, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| PUCCH FORMAT | NUMBER OF SYMBOLS IN SLOT | NUMBER OF BITS | Pre-DFT OCC |
|---|---|---|---|
| 0 | 1-2 | ≤2 | N.A. |
| 1 | 4-14 | ≤2 | N.A. |
| 2 | 1-2 | >2 | N.A. |
| 3 | 4-14 | >2 | No |
| 4 | 4-14 | >2 | Yes |

FIG. 2

| LONG-PUCCH DURATION N | OCC MULTIPLEXING CAPACITY M | |
|---|---|---|
| | WITH HOPPING | WITHOUT HOPPING |
| 4 | 1 | 2 |
| 5 | 1 | 2 |
| 6 | 1 | 3 |
| 7 | 1 | 3 |
| 8 | 2 | 4 |
| 9 | 2 | 4 |
| 10 | 2 | 5 |
| 11 | 2 | 5 |
| 12 | 3 | 6 |
| 13 | 3 | 6 |
| 14 | 3 | 7 |

FIG. 3

EVEN-NUMBER TABLE

| STARTING SYMBOL | DURATION | FREQUENCY HOPPING | OCC |
|---|---|---|---|
| EVEN NUMBER | 14 | 7,7 | 3 |
| EVEN NUMBER | 13 | 7,6 | 3 |
| EVEN NUMBER | 12 | 6,6 | 3 |
| EVEN NUMBER | 11 | 6,5 | 2 |
| EVEN NUMBER | 10 | 5,5 | 2 |
| EVEN NUMBER | 9 | 5,4 | 2 |
| EVEN NUMBER | 8 | 4,4 | 2 |
| EVEN NUMBER | 7 | 4,3 | 1 |
| EVEN NUMBER | 6 | 3,3 | 1 |
| EVEN NUMBER | 5 | 3,2 | 1 |
| EVEN NUMBER | 4 | 2,2 | 1 |

ODD-NUMBER TABLE

| STARTING SYMBOL | DURATION | FREQUENCY HOPPING | OCC |
|---|---|---|---|
| ODD NUMBER | 14 | 7,7 | 3 |
| ODD NUMBER | 13 | 6,7 | 3 |
| ODD NUMBER | 12 | 6,6 | 3 |
| ODD NUMBER | 11 | 5,6 | 2 |
| ODD NUMBER | 10 | 5,5 | 2 |
| ODD NUMBER | 9 | 4,5 | 2 |
| ODD NUMBER | 8 | 4,4 | 2 |
| ODD NUMBER | 7 | 3,4 | 1 |
| ODD NUMBER | 6 | 3,3 | 1 |
| ODD NUMBER | 5 | 2,3 | 1 |
| ODD NUMBER | 4 | 2,2 | 1 |

EVEN-NUMBER TABLE

| STARTING SYMBOL | DURATION | FREQUENCY HOPPING | OCC |
|---|---|---|---|
| EVEN NUMBER | 14 | 7,7 | 3 |
| EVEN NUMBER | 13 | 7,6 | 3 |
| EVEN NUMBER | 12 | 6,6 | 3 |
| EVEN NUMBER | 11 | 6,5 | 2 |
| EVEN NUMBER | 10 | 5,5 | 2 |
| EVEN NUMBER | 9 | 5,4 | 2 |
| EVEN NUMBER | 8 | 4,4 | 2 |
| EVEN NUMBER | 7 | 4,3 | 1 |
| EVEN NUMBER | 6 | 2,4 | 1 |
| EVEN NUMBER | 5 | 2,3 | 1 |
| EVEN NUMBER | 4 | 2,2 | 1 |

ODD-NUMBER TABLE

| STARTING SYMBOL | DURATION | FREQUENCY HOPPING | OCC |
|---|---|---|---|
| ODD NUMBER | 14 | 7,7 | 3 |
| ODD NUMBER | 13 | 6,7 | 3 |
| ODD NUMBER | 12 | 6,6 | 3 |
| ODD NUMBER | 11 | 5,6 | 2 |
| ODD NUMBER | 10 | 5,5 | 2 |
| ODD NUMBER | 9 | 4,5 | 2 |
| ODD NUMBER | 8 | 4,4 | 2 |
| ODD NUMBER | 7 | 3,4 | 1 |
| ODD NUMBER | 6 | 3,3 | 1 |
| ODD NUMBER | 5 | 2,3 | 1 |
| ODD NUMBER | 4 | 2,2 | 1 |

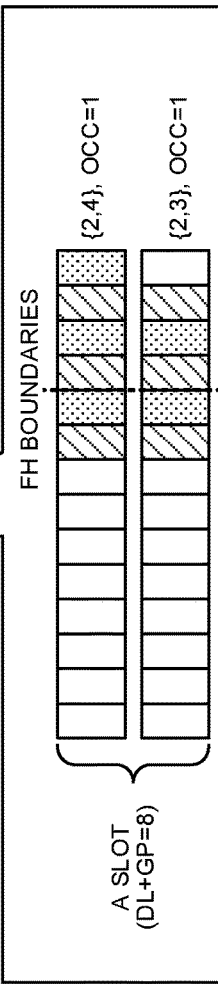

A SLOT (DL+GP=8)
FH BOUNDARIES
{2,4}, OCC=1
{2,3}, OCC=1

FIG. 12

ODD-NUMBER TABLE

| STARTING SYMBOL | DURATION | FREQUENCY HOPPING | OCC |
|---|---|---|---|
| ODD NUMBER | 14 | 7,7 | 3 |
| ODD NUMBER | 13 | 6,7 | 3 |
| ODD NUMBER | 12 | 6,6 | 3 |
| ODD NUMBER | 11 | 5,6 | 2 |
| ODD NUMBER | 10 | 5,5 | 2 |
| ODD NUMBER | 9 | 4,5 | 2 |
| ODD NUMBER | 8 | 4,4 | 2 |
| ODD NUMBER | 7 | 2,5 | 1 |
| ODD NUMBER | 6 | 2,4 | 1 |
| ODD NUMBER | 5 | 2,3 | 1 |
| ODD NUMBER | 4 | 2,2 | 1 |

EVEN-NUMBER TABLE

| STARTING SYMBOL | DURATION | FREQUENCY HOPPING | OCC |
|---|---|---|---|
| EVEN NUMBER | 14 | 7,7 | 3 |
| EVEN NUMBER | 13 | 7,6 | 3 |
| EVEN NUMBER | 12 | 6,6 | 3 |
| EVEN NUMBER | 11 | 6,5 | 2 |
| EVEN NUMBER | 10 | 5,5 | 2 |
| EVEN NUMBER | 9 | 5,4 | 2 |
| EVEN NUMBER | 8 | 4,4 | 2 |
| EVEN NUMBER | 7 | 4,3 | 1 |
| EVEN NUMBER | 6 | 2,4 | 1 |
| EVEN NUMBER | 5 | 2,3 | 1 |
| EVEN NUMBER | 4 | 2,2 | 1 |

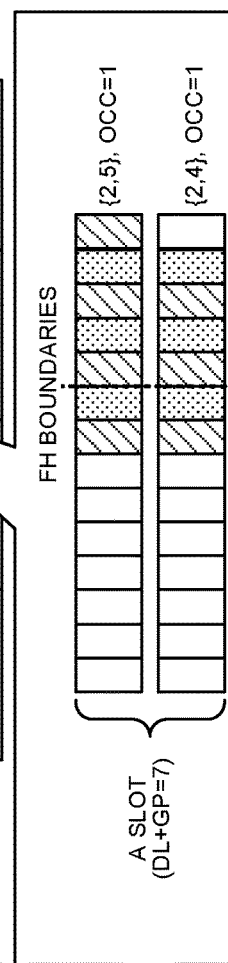

{2,5}, OCC=1
{2,4}, OCC=1
FH BOUNDARIES
A SLOT (DL+GP=7)

FIG. 13

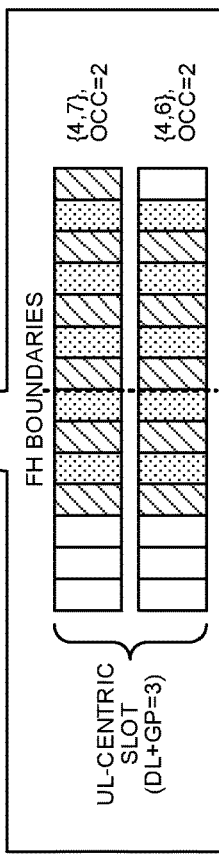

ODD-NUMBER TABLE

| STARTING SYMBOL | DURATION | FREQUENCY HOPPING | OCC |
|---|---|---|---|
| ODD NUMBER | 14 | 7,7 | 3 |
| ODD NUMBER | 13 | 6,7 | 3 |
| ODD NUMBER | 12 | 6,6 | 3 |
| ODD NUMBER | 11 | 4,7 | 2 |
| ODD NUMBER | 10 | 4,6 | 2 |
| ODD NUMBER | 9 | 4,5 | 2 |
| ODD NUMBER | 8 | 4,4 | 2 |
| ODD NUMBER | 7 | 2,5 | 1 |
| ODD NUMBER | 6 | 2,4 | 1 |
| ODD NUMBER | 5 | 2,3 | 1 |
| ODD NUMBER | 4 | 2,2 | 1 |

UL-CENTRIC SLOT (DL+GP=3)

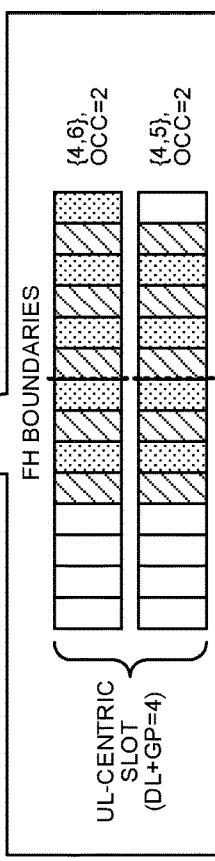

EVEN-NUMBER TABLE

| STARTING SYMBOL | DURATION | FREQUENCY HOPPING | OCC |
|---|---|---|---|
| EVEN NUMBER | 14 | 7,7 | 3 |
| EVEN NUMBER | 13 | 7,6 | 3 |
| EVEN NUMBER | 12 | 6,6 | 3 |
| EVEN NUMBER | 11 | 6,5 | 2 |
| EVEN NUMBER | 10 | 4,6 | 2 |
| EVEN NUMBER | 9 | 4,5 | 2 |
| EVEN NUMBER | 8 | 4,4 | 2 |
| EVEN NUMBER | 7 | 4,3 | 1 |
| EVEN NUMBER | 6 | 2,4 | 1 |
| EVEN NUMBER | 5 | 2,3 | 1 |
| EVEN NUMBER | 4 | 2,2 | 1 |

UL-CENTRIC SLOT (DL+GP=4)

EVEN-NUMBER TABLE

| STARTING SYMBOL | DURATION | FREQUENCY HOPPING | OCC |
|---|---|---|---|
| EVEN NUMBER | 14 | 6,8 | 3 |
| EVEN NUMBER | 13 | 6,7 | 3 |
| EVEN NUMBER | 12 | 6,6 | 3 |
| EVEN NUMBER | 11 | 6,5 | 2 |
| EVEN NUMBER | 10 | 4,6 | 2 |
| EVEN NUMBER | 9 | 4,5 | 2 |
| EVEN NUMBER | 8 | 4,4 | 2 |
| EVEN NUMBER | 7 | 4,3 | 1 |
| EVEN NUMBER | 6 | 2,4 | 1 |
| EVEN NUMBER | 5 | 2,3 | 1 |
| EVEN NUMBER | 4 | 2,2 | 1 |

ODD-NUMBER TABLE

| STARTING SYMBOL | DURATION | FREQUENCY HOPPING | OCC |
|---|---|---|---|
| ODD NUMBER | 14 | 6,8 | 3 |
| ODD NUMBER | 13 | 6,7 | 3 |
| ODD NUMBER | 12 | 6,6 | 3 |
| ODD NUMBER | 11 | 4,7 | 2 |
| ODD NUMBER | 10 | 4,6 | 2 |
| ODD NUMBER | 9 | 4,5 | 2 |
| ODD NUMBER | 8 | 4,4 | 2 |
| ODD NUMBER | 7 | 2,5 | 1 |
| ODD NUMBER | 6 | 2,4 | 1 |
| ODD NUMBER | 5 | 2,3 | 1 |
| ODD NUMBER | 4 | 2,2 | 1 |

FIG. 14

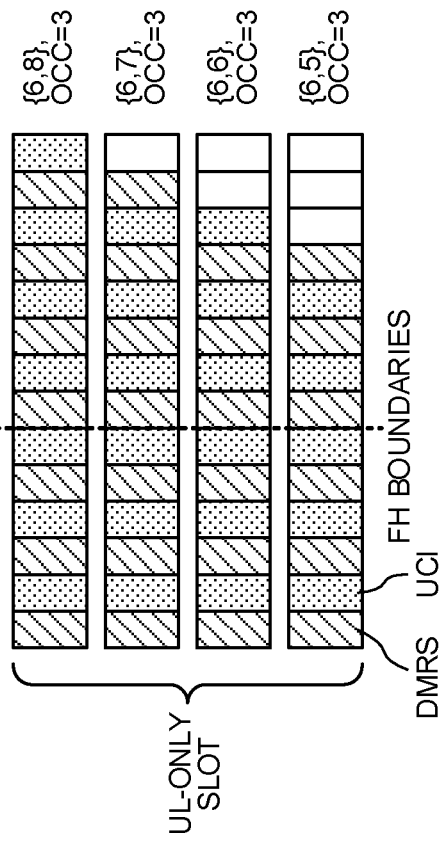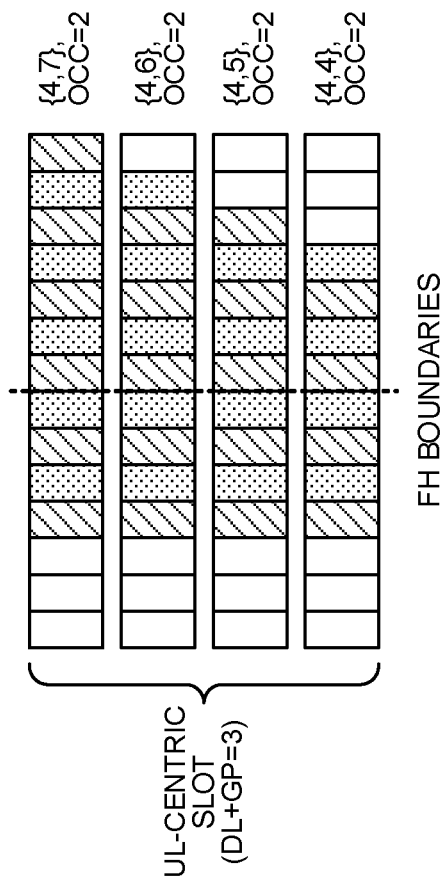

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to Rel. 13), downlink (DL) and/or uplink (UL) communications are carried out using 1 ms subframes (referred to as, for example, "Transmission Time Intervals (TTIs)"). This subframe is the unit of time to transmit one data packet that is channel-encoded, and is the processing unit in scheduling, link adaptation, retransmission control (HARQ (Hybrid Automatic Repeat reQuest)), and so on.

In existing LTE systems (for example, LTE Rel. 8 to Rel. 13), a user terminal transmits uplink control information (UCI) by using an uplink control channel (for example, PUCCH (Physical Uplink Control Channel)) or an uplink data channel (for example, PUSCH (Physical Uplink Shared Channel)). A structure (format) of the uplink control channel is referred to as a "PUCCH format (PF)," for example.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14 and Rel. 15 (or later versions), 5G, NR, and the like), it is studied to support, in such future radio communication systems, a first uplink control channel (also referred to as a "short PUCCH," "PUCCH format 0" or "PUCCH format 2," and the like) of a relatively short duration (for example, one to two symbols) and a second uplink control channel (also referred to as a "long PUCCH," "PUCCH format 1," "PUCCH format 3," or "PUCCH format 4," and the like) of a longer duration (for example, 4 to 14 symbols) than that of the first uplink control channel.

In the above-mentioned future radio communication systems, it is assumed that uplink control channels (for example, long PUCCHs) of a plurality of user terminals having different durations and/or starting symbols are multiplexed in the same slot. However, in a case that frequency hopping is performed on the plurality of uplink control channels, hopping boundaries of the plurality of uplink control channels result in being different, and this may consequently cause an increase in radio resources (for example, time resources and/or frequency resources) not allocated to any of the user terminals and a decrease in utilization efficiency of radio resources.

The present invention has been made in view of the above respect, and it is therefore an object of the present invention to provide a user terminal and a radio communication method, which can improve utilization efficiency of radio resources in a case that uplink control channels of a plurality of user terminals having different durations and/or starting symbols are multiplexed in the same slot.

Solution to Problem

An aspect of a user terminal of the present invention includes a transmitting section that transmits uplink control information (UCI) by using an uplink control channel, and a control section that controls a hopping timing of a frequency resource to which the uplink control channel is mapped, based on whether an index of a starting symbol of the uplink control channel is an even number or an odd number and a duration of the uplink control channel.

Advantageous Effects of Invention

According to the present invention, it is possible to improve utilization efficiency of radio resources in a case that uplink control channels of a plurality of user terminals having different durations and/or starting symbols are multiplexed in the same slot.

BRIEF DESCRIPTION OF DRAWINGS

FIG. 2 is a diagram to show an example of PUCCH formats in the future radio communication system;

FIG. 3 is a diagram to show an example of OCC multiplexing capacity for each long-PUCCH duration;

FIG. 6 is a diagram to show an example of tables used for determination of a hopping boundary according to a first aspect;

FIG. 10 is a diagram to show an example of tables used for determination of a hopping boundary according to a second aspect;

FIG. 12 is a diagram to show another example of the tables used for determination of a hopping boundary according to the second aspect;

FIG. 13 is a diagram to show still another example of the tables used for determination of a hopping boundary according to the second aspect;

FIG. 14 is a diagram to show an example of tables used for determination of a hopping boundary according to a third aspect;

FIGS. 15A and 15B are diagrams to show examples of a case where hopping boundaries of a plurality of long PUCCHs match, the long PUCCHs having the same starting symbol and different durations by three symbols at maximum;

DESCRIPTION OF EMBODIMENTS

Existing LTE systems (LTE Rel. 13 or former versions) support uplink control channels (for example, PUCCHs) of a plurality of formats (for example, LTE PUCCH formats (LTE PFs) 1 to 5 and so on) of the same duration (for example, 14 symbols in a normal cyclic prefix (CP)).

In future radio communication systems (for example, LTE Rel. 15 (or later versions), 5G, NR, and so on), a study is underway to transmit UCI by using uplink control channels (for example, PUCCHs) of a plurality of formats (for example, NR PUCCH formats (NR PFs), also referred to simply as "PUCCH formats") having at least different durations.

Figure 1A:
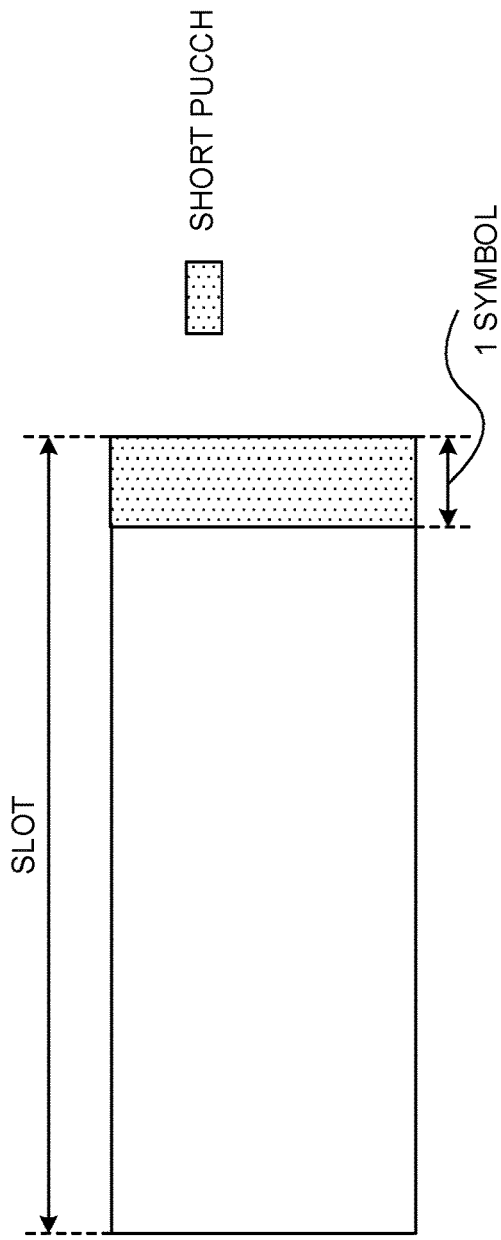
FIGS. 1A and 1B are diagrams to show configuration examples of an uplink control channel in a future radio communication system.
Figure 1B:
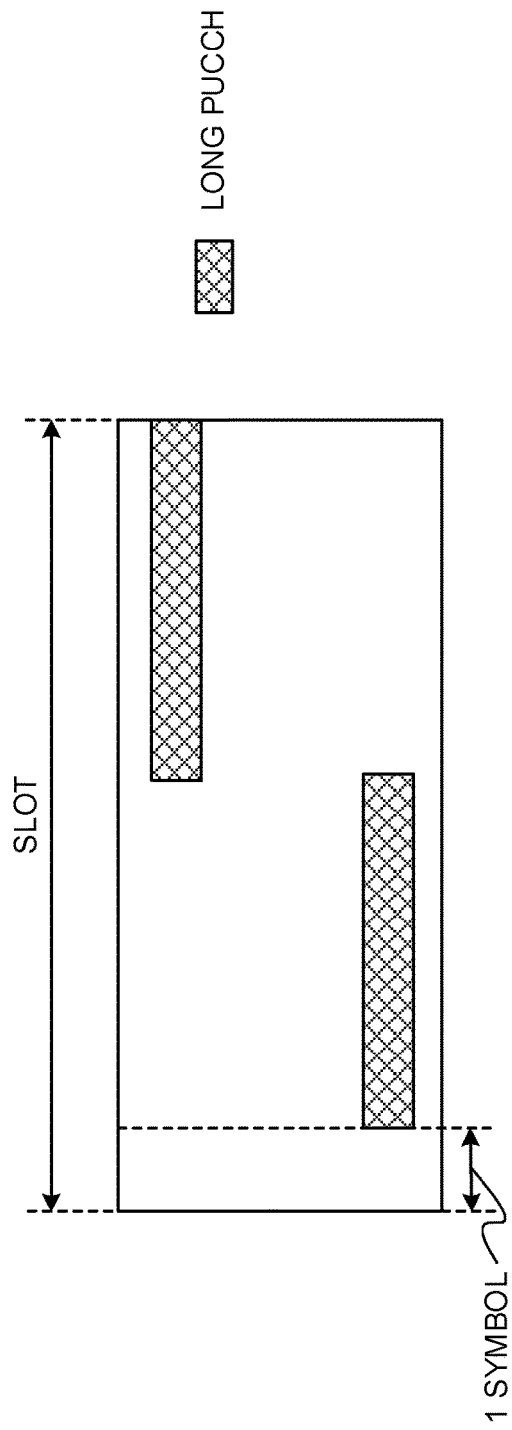
Figure 4:
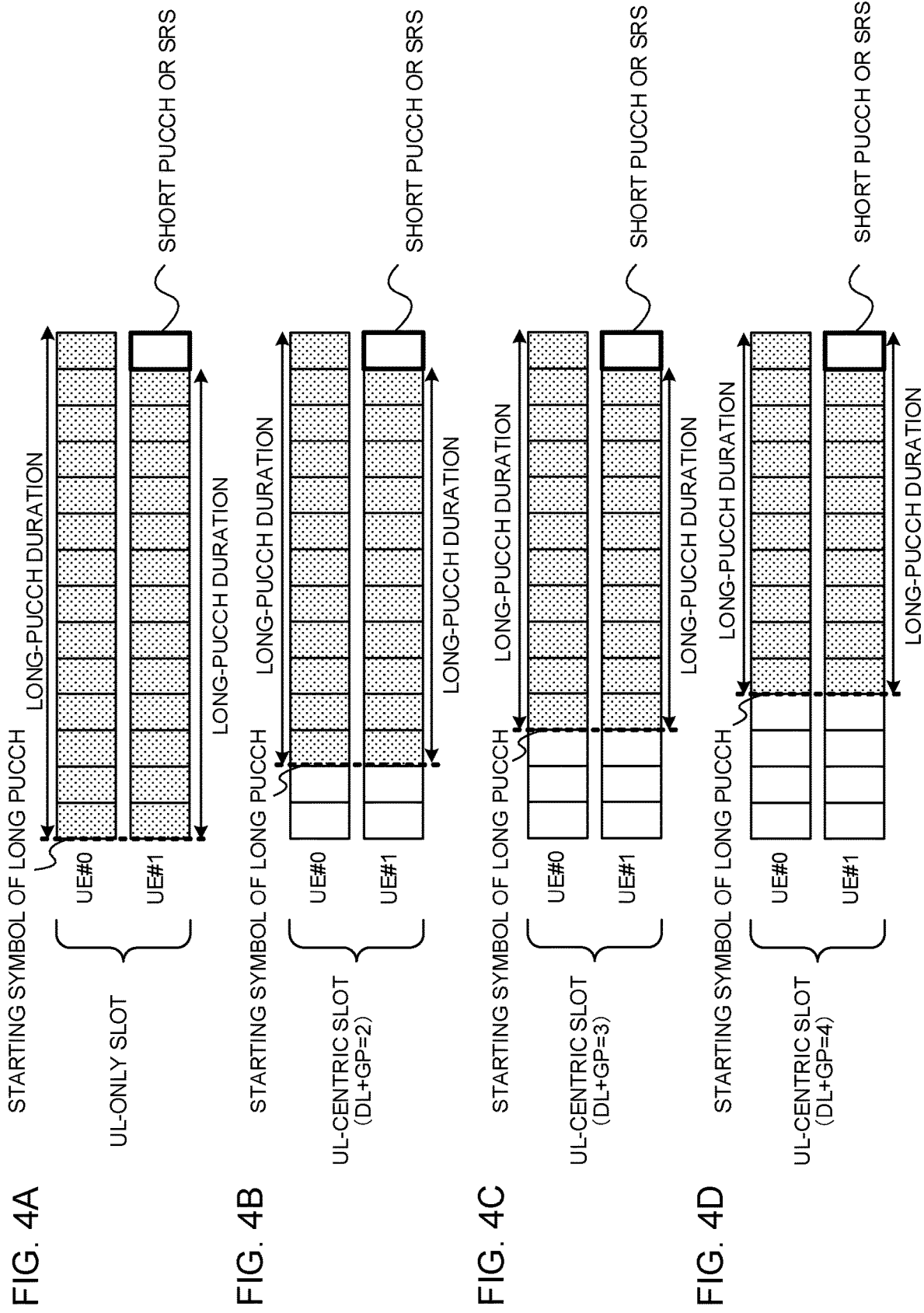
FIGS. 4A to 4D are diagrams to show examples of a long-PUCCH duration and a long PUCCH starting symbol.

FIGS. 1A and 1B are diagrams to show examples of a PUCCH in a future radio communication system. FIG. 1A shows a PUCCH (a short PUCCH or first uplink control channel) constituted of a relatively small number of symbols (duration, for example, one to two symbols). FIG. 1B shows a PUCCH (a long PUCCH or second uplink control channel) constituted of a larger number of symbols (duration, for example, 4 to 14 symbols) than that of the short PUCCH.

As shown in FIG. 1A, the short PUCCH may be mapped to a certain number of symbols (for example, one to two symbols) from the end of a slot. Note that the symbols to which the short PUCCH is mapped are not limited to those at the end of the slot but may be the certain number of symbols at the start of or in the middle of the slot. In addition, the short PUCCH is mapped to one or more frequency resources (for example, one or more PRBs). Note that it is assumed in FIG. 1A that the short PUCCH is mapped to consecutive PRBs, but the short PUCCH may be mapped to nonconsecutive PRBs.

Alternatively, the short PUCCH may be time-division-multiplexed and/or frequency-division-multiplexed with an uplink data channel (hereinafter also referred to as a "PUCCH") in the slot. Furthermore, the short PUCCH may be time-division-multiplexed and/or frequency-division-multiplexed with a downlink data channel (hereinafter also referred to as a "PDSCH") and/or a downlink control channel (hereinafter also referred to as a "PDCCH (Physical Downlink Control Channel)") in the slot.

The short PUCCH may use a multi-carrier waveform (for example, an OFDM (Orthogonal Frequency Division Multiplexing) waveform) or may use a single-carrier waveform (for example, a DFT-s-OFDM (Discrete Fourier Transform-Spread-Orthogonal Frequency Division Multiplexing) waveform).

Meanwhile, as shown in FIG. 1B, the long PUCCH may be mapped over a larger number of symbols (for example, 4 to 14 symbols) than that of the short PUCCH. In FIG. 1B, the long PUCCH is not mapped to a certain number of symbols at the starting of the slot but may be mapped to the certain number of symbols at the start.

As shown in FIG. 1B, to obtain a power boosting effect, the long PUCCH may be constituted of a smaller number of frequency resources (for example, one or two PRBs) than that of the short PUCCH or may be constituted of the equal number of frequency resources to that of the short PUCCH.

The long PUCCH may be frequency-division-multiplexed with a PUSCH in the slot. The long PUCCH may be time-division-multiplexed with a PDCCH in the slot. The long PUCCH may be mapped to the same slot as that of the short PUCCH. In the long PUCCH, a single-carrier waveform (for example, a DFT-s-OFDM waveform) may be used, or a multi-carrier waveform (for example, an OFDM waveform) may be used.

As shown in FIG. 1B, frequency hopping in which a frequency resource hops at a certain timing in a slot may be performed on the long PUCCH. The timing of hopping of a frequency resource in the long PUCCH may be referred to as a "hopping boundary," a "hopping timing," a "hopping pattern," and the like.

FIG. 2 is a diagram to show an example of PUCCH formats in the future radio communication system. FIG. 2 shows a plurality of PUCCH formats (NR PUCCH formats) having different numbers of symbols and/or numbers of UCI bits. Note that the PUCCH formats shown in FIG. 2 are only examples and the contents of PUCCH formats 0 to 4, numbers, and the like are not limited to those shown in FIG. 2.

For example, in FIG. 2, PUCCH format 0 is a short PUCCH for UCI of up to two bits (for example, FIG. 1A) and is also referred to as a "sequence-based short PUCCH" and the like. The short PUCCH conveys UCI (for example, an HARQ-ACK and/or a scheduling request (SR)) of up to two bits by using one or two symbols.

PUCCH format 1 is a long PUCCH for UCI of up to two bits (for example, FIG. 1B). The long PUCCH conveys UCI of up to two bits by using 4 to 14 symbols. In PUCCH format 1, code division multiplexing (CDM) may be performed for a plurality of user terminals within the same PRB(s) by employing time-domain block-wise spreading using cyclic shift (CS) and/or orthogonal cover code (OCC), for example.

PUCCH format 2 is a short PUCCH for UCI of more than two bits (for example, FIG. 1A). The short PUCCH conveys UCI of more than two bits by using one to two symbols.

PUCCH format 3 is a long PUCCH for UCI of more than two bits (for example, FIG. 1B), and multiplexing may be performed for a plurality of user terminals within the same PRB(s). The long PUCCH conveys UCI of more than two bits by using 4 to 14 symbols. In PUCCH format 3, code division multiplexing may be performed for the plurality of user terminals within the same PRB(s) by employing time-domain block-wise spreading using CS and/or OCC. Alternatively, multiplexing may be performed for the plurality of user terminals by using at least one of (frequency-domain) block-wise spreading before discrete Fourier transform (DFT), frequency division multiplexing (FDM), and comb subcarriers. OCC before DFT spreading need not necessarily be employed for PUCCH format 3.

PUCCH format 4 is a long PUCCH for UCI of more than two bits (for example, FIG. 1B), and multiplexing may be performed for a single user terminal within the same PRB(s). The long PUCCH conveys UCI of more than two bits. PUCCH format 4 may be different from PUCCH format 3 in that multiplexing is not performed for a plurality of user terminals within the same PRB(s). OCC may be employed for PUCCH format 4 before DFT spreading.

In the future radio communication systems (for example, LTE Rel. 15 (or later versions), 5G, NR, and the like), the number of user terminals for which multiplexing is performed by employing OCC is determined according to the duration of a long PUCCH (for example, PF1 conveying UCI of up to two bits) (a long-PUCCH duration). The number of user terminals for which multiplexing is performed by employing OCC may be interpreted as "OCC multiplexing capacity," an "OCC length," a "spreading factor," and the like.

FIG. 3 is a diagram to show an example of OCC multiplexing capacity for each long-PUCCH duration. As shown in FIG. 3, a different value may be determined for OCC multiplexing capacity M for each long-PUCCH duration depending on whether frequency hopping is performed within the long-PUCCH duration. For example, in FIG. 3, in a case that a long-PUCCH duration N corresponds to 14 symbols, OCC multiplexing capacity is three when frequency hopping is performed, while OCC multiplexing capacity is seven when frequency hopping is not performed.

In the above-mentioned future radio communication systems, it is assumed that a long-PUCCH duration and the starting position (starting symbol) of the long PUCCH is different for each user terminal. FIGS. 4A to 4D are diagrams to show examples of a long-PUCCH duration and a long PUCCH starting symbol.

As shown in FIGS. 4A to 4D, a long-PUCCH duration may be different for each slot type (for example, a slot including only UL symbols (a UL only slot) or a slot including DL symbols and UL symbols but including a larger number of UL symbols than that of DL symbols (a UL-centric slot)). In a UL centric-slot, a symbol for switching between a DL symbol and a UL symbol (a guard period (GP)) may be provided.

As shown in FIGS. 4A to 4D and FIG. 5, the long-PUCCH duration may be shortened depending on the presence or absence of a short PUCCH and/or a sounding reference signal (SRS). The duration of a short-PUCCH (a short-PUCCH duration) may correspond to one or two symbols, for example. The duration in which an SRS is mapped may correspond to one, two, or four consecutive symbols, for example.

The long-PUCCH duration may be reported from a network (for example, a radio base station) to each individual user terminal (individual UE) (a long-PUCCH duration of a different length may be reported to each UE). A method of reporting a long-PUCCH duration may be reported by a higher layer and/or the physical layer, or a plurality of candidates may be reported by a higher layer and one of the candidates may be specified by the physical layer.

In a case that frequency hopping is employed for a plurality of long PUCCHs having different durations and/or starting symbols as described above, it is assumed that a hopping boundary for each of the plurality of long PUCCHs is determined by the corresponding user terminal itself, based on the duration and/or starting position of the corresponding one of the plurality of long PUCCHs.

However, in a case that multiplexing is performed, within the same slot, for a plurality of user terminals using the plurality of respective long PUCCHs having different durations and/or starting symbols, hopping boundaries of the plurality of long PUCCHs result in being different, and this may consequently cause an increase in radio resources (for example, time resources and/or frequency resources) not allocated to any of the user terminals and a decrease in utilization efficiency of radio resources.

To address this, the inventors of the present invention focused on that utilization efficiency of radio resources can be improved by causing hopping boundaries to match among a plurality of long PUCCHs having the same starting symbol and different durations by a certain number of symbols and reached the present invention.

Hereinafter, the present embodiment will be described in detail. In the following, a "long PUCCH" is assumed to be a long PUCCH that can transmit UCI of up to two bits (for example, PUCCH format 1 in FIG. 2), but is also applicable, without being limited thereto, to a long PUCCH that can transmit UCI of more than two bits (for example, PUCCH format 3 and/or 4 in FIG. 2).

(First Aspect)

In the first aspect, a user terminal controls a hopping timing (a hopping boundary) of a frequency resource to which a long PUCCH is mapped, based on whether the index of the starting symbol of the long PUCCH is an even number or an odd number and the duration of the long PUCCH (a long-PUCCH duration N).

Specifically, the user terminal may control a hopping boundary by using different mathematical expressions or a table depending on a case where the index of the starting symbol of the long PUCCH is an even number and a case where the index is an odd number.

<Case of Using Mathematical Expressions>

In a case that the index of the starting symbol of the long PUCCH is an even number, the user terminal may determine a hopping boundary, based on a ceiling function value of the long-PUCCH duration N/2. For example, assume that the number of symbols before hopping in the long-PUCCH duration (the number of symbols corresponding to one of frequency resources) is denoted by a, and the number of symbols after hopping (the number of symbols corresponding to the other of the frequency resources) is denoted by b. In this case, a and b may be expressed by Expressions 1 below.

$$a = \text{Ceil}(N/2), b = N - \text{Ceil}(N/2) \qquad \text{(Expressions 1)}$$

In contrast, in a case that the index of the starting symbol of the long PUCCH is an odd number, the user terminal may determine a hopping boundary, based on a floor function value of the long-PUCCH duration N/2. For example, assume that the number of symbols before hopping in the long-PUCCH duration (the number of symbols corresponding to one of frequency resources) is denoted by a, and the number of symbols after hopping (the number of symbols corresponding to the other of the frequency resources) is denoted by b. In this case, a and b may be expressed by the expressions below.

$$a=\text{floor}(N/2), b=N-\text{floor}(N/2) \quad \text{(Expressions 2)}$$

<Case of Using Tables>

The user terminal may determine a hopping boundary by using an even-number table (a first table) in the case that the index of the starting symbol of the long PUCCH is an even number, and determine the hopping boundary by using an odd-number table (a second table) in the case that the index of the starting symbol of the long PUCCH is an odd number.

FIG. 6 is a diagram to show an example of tables used for determination of a hopping boundary according to the first aspect. FIG. 6 shows an even-number table used for determination of a hopping boundary in the case that the index of a starting symbol of a long PUCCH is an even number and an odd-number table used for determination of a hopping boundary in the case that the index of the starting symbol is an odd number. As shown in FIG. 6, in each of the even-number table and the odd-number table, at least a long-PUCCH duration and information indicating frequency hopping (frequency hopping information) are associated with each other.

For example, in each of the even-number table and the odd-number table shown in FIG. 6, the numbers of symbols (a, b) before and after hopping in each of long-PUCCH duration is associated with the long-PUCCH duration, as frequency hopping information (information indicating a hopping boundary or a hopping pattern). As shown in each of the even-number table and the odd-number table in FIG. 6, the numbers of symbols (a, b) before and after hopping for each long-PUCCH duration may be the same as the values obtained by calculation using corresponding ones of the Expressions 1 and 2 described above.

In each of the even-number table and the odd-number table shown in FIG. 6, the OCC multiplexing capacity (OCC) and/or information indicating whether the starting symbol is an even number or an odd number may be associated in addition to a long-PUCCH duration and frequency hopping information.

Figure 7:
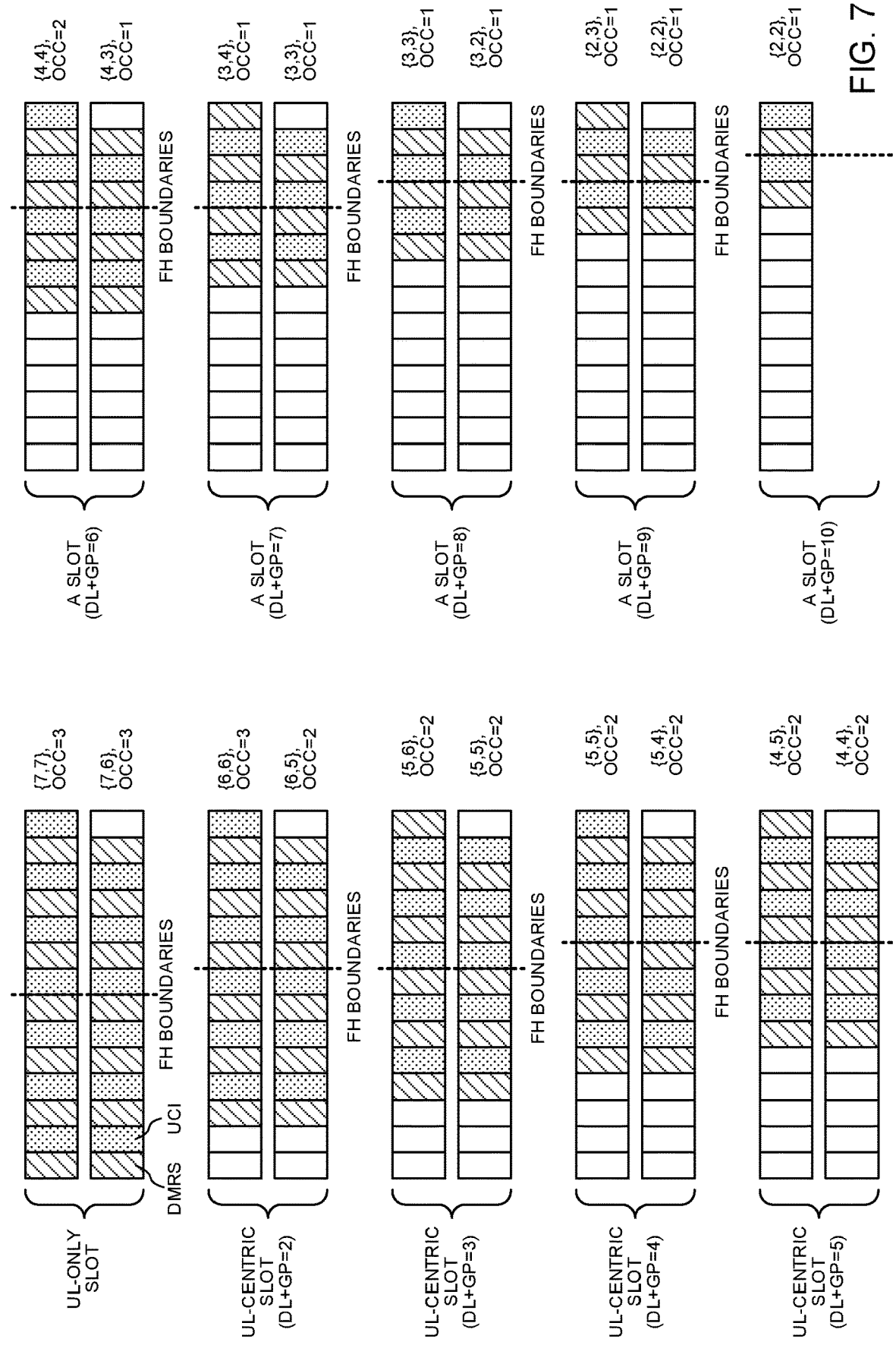
FIG. 7 is a diagram to show an example of a hopping boundary for each long-PUCCH duration according to the first aspect.

FIG. 7 is a diagram to show an example of a hopping boundary for each long-PUCCH duration according to the first aspect. FIG. 7 shows, for each PUCCH duration N, a hopping boundary determined by using Expressions 1 or 2 described above or the even-number table and the odd-number table shown in FIG. 6.

Note that, although FIG. 7 illustrates an example in which symbols for UCI (UCI symbols) and symbols for a demodulation reference signal (DMRS) for the UCI (DMRS symbol) are alternately mapped in each long-PUCCH duration, a DMRS symbol mapping pattern is not limited to that shown in FIG. 7. Each A slot in FIG. 7 may be referred to as a "UL-centric slot," a "DL-centric slot," or the like.

For example, in FIG. 7, in a case that a long PUCCH starts at symbol #0 and that the long-PUCCH duration N corresponds to 14 symbols, the numbers of symbols (a, b) before and after hopping=(7, 7) are determined based on Expressions 1 or the even-number table shown in FIG. 6. In other words, a hopping boundary is determined between the seventh symbol and the eighth symbol in the long PUCCH. Furthermore, in FIG. 7, in a case that a long PUCCH starts at symbol #0 and that the long-PUCCH duration N corresponds to 13 symbols, the numbers of symbols (a, b) before and after hopping=(7, 6) are determined based on Expressions 1 or the even-number table shown in FIG. 6. In other words, a hopping boundary is determined between the seventh symbol and the eighth symbol in the long PUCCH.

Similarly, in a case that a long PUCCH starts at symbol #2, #4, #6, #8, or #10, the numbers of symbols before and after hopping (that is, a hopping boundary) according to the long-PUCCH duration N are determined by using Expressions 1 or the even-number table shown in FIG. 6. In contrast, in a case that a long PUCCH starts at symbol #1, #3, #5, #7, or #9, the numbers of symbols before and after hopping (that is, a hopping boundary) according to the long-PUCCH duration N are determined by using Expressions 2 or the odd-number table shown in FIG. 6.

In FIG. 7, hopping boundaries match among a plurality of long PUCCHs having starting symbols of the same index and different durations by one symbol (for example, a long PUCCH of 14 symbols and a long PUCCH of 13 symbols). Since each hopping boundary shown in FIG. 7 satisfies the OCC multiplexing capacity of the corresponding long-PUCCH duration (for example, a case with frequency hopping in FIG. 3), multiplexing can be performed for a certain number of user terminals (for example, three user terminals in the case of a long PUCCH of 14 symbols in FIG. 3) on the same long PUCCH even in a case that frequency hopping is performed.

As described above, according to the first aspect, it is possible to match hopping timings among a plurality of long PUCCHs having at least the starting symbols of the same index and different durations by the certain number of symbols (for example, one symbol), which can improve utilization efficiency of radio resources.

Figure 8:
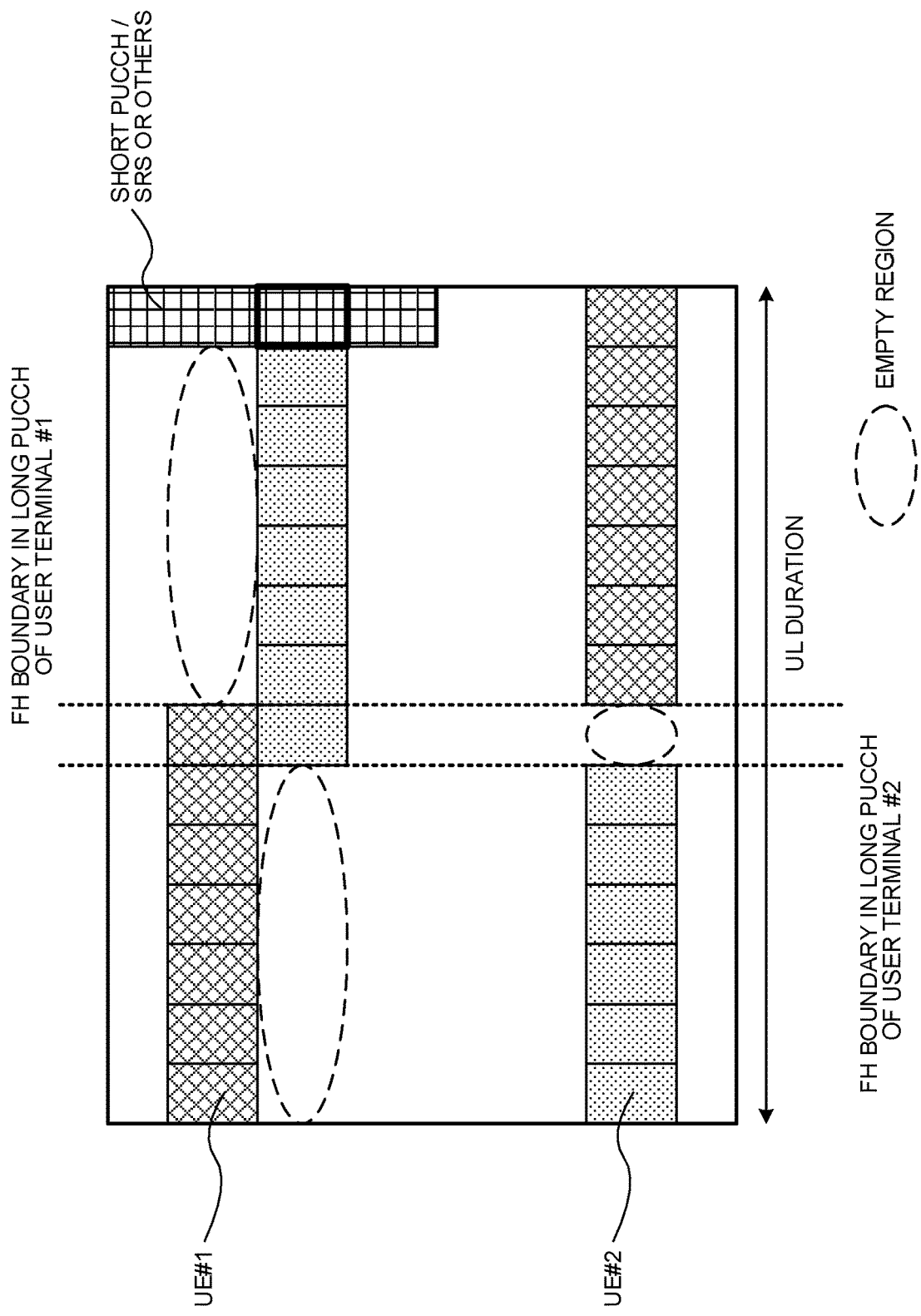
FIG. 8 is a diagram to show an example of a case where hopping boundaries of a plurality of long PUCCHs do not match, the long PUCCHs having the same starting symbol and different durations.

For example, as shown in FIG. 8, even in a case that long PUCCHs of user terminals #1 and #2 start from same symbol #0, since the long-PUCCH duration of user terminal #2 is shorter than the duration of the long PUCCH of user terminal #1 by the certain number of symbols (for example, one symbol in FIG. 8), this may cause radio resources (empty regions) not allocated to any of the user terminals when hopping boundaries are different between user terminals #1 and #2.

Figure 9:
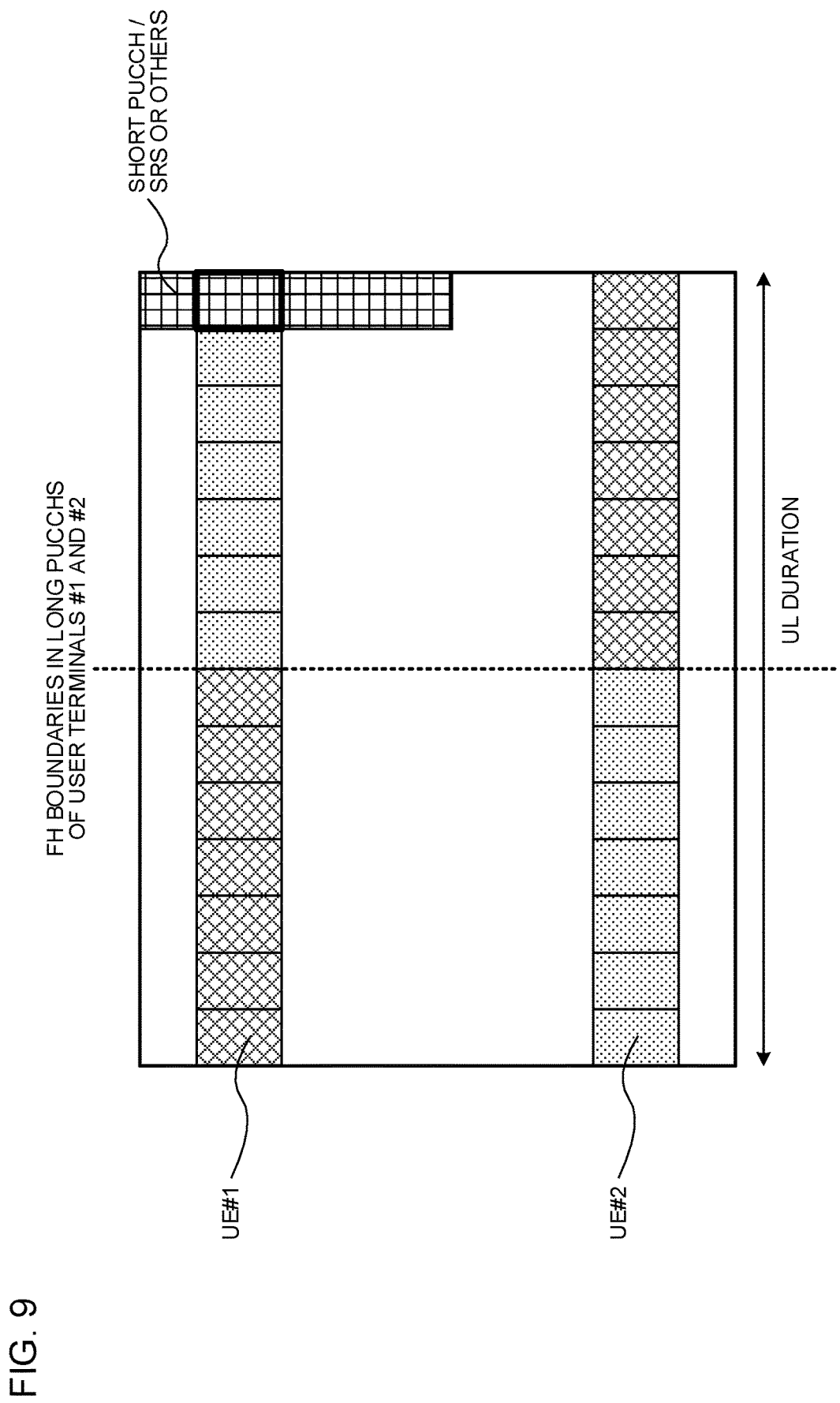
FIG. 9 is a diagram to show an example of a case where hopping boundaries of a plurality of long PUCCHs match, the long PUCCHs having the same starting symbol and different durations.

In contrast, as shown in FIG. 9, in the case that the long PUCCHs of user terminals #1 and #2 start at same symbol #0, it is possible to prevent occurrence of any empty duration when the hopping boundaries match between user terminals #1 and #2 even if the duration of the long-PUCCH of user terminal #2 is shorter than that of the long PUCCH of user terminal #1 by the certain number of symbols (for example, one symbol in FIG. 9). As a result of this, it is possible to improve utilization efficiency of radio resources.

(Second Aspect)

In a second aspect, variations in the case of using the even-number table and the odd-number table in the first aspect will be described. In the case of using the even-number table and the odd-number table shown in FIG. 6, the ratio between UCI symbols and DMRS symbols that are mapped to the same frequency resource in a long PUCCH of a specific duration may not necessarily satisfy a certain threshold (for example, 50%), and this may cause a deterioration in characteristics in the long PUCCH of the specific duration.

In view of this, in the second aspect, a hopping timing for an uplink control channel of each specific duration is defined based on the ratio between UCI and a demodulation reference signal that are mapped to the same frequency resource, in an even-number table and/or an odd-number table.

FIG. 10 is a diagram to show an example of tables used for determination of a hopping boundary according to the second aspect. In the even-number table shown in FIG. 10, the numbers of symbols (a, b) before and after hopping associated with a long-PUCCH duration of specific symbols (here, six symbols and five symbols) are configured to different values from those in the even-number table shown in FIG. 6. Note that the odd-number table shown in FIG. 10 is similar to the odd-number table shown in FIG. 6.

Specifically, the numbers of symbols (a, b) before and after hopping associated with the long-PUCCH duration of six symbols are (3, 3) in the even-number table shown in FIG. 6 while being (2, 4) in the even-number table shown in FIG. 10. The numbers of symbols (a, b) before and after hopping associated with the long-PUCCH duration of five symbols are (3, 2) in the even-number table in FIG. 6 while being (2, 3) in the even-number table shown in FIG. 10.

When the numbers of symbols (a, b) before and after hopping associated with the long-PUCCH duration of six symbols are (3, 3), the ratio between UCI symbols and DMRS symbols after the hopping is lower than 50% (refer to a case where DL+GP=8 in FIG. 7). In contrast, when the numbers of symbols (a, b) are (2, 4), the ratio between UCI symbols and DMRS symbols after the hopping is 50% as shown in FIG. 10.

As described above, according to the even-number table shown in FIG. 10, the ratio between UCI symbols and DMRSs that are mapped to the same frequency resource in the long PUCCH of six symbols satisfies the certain threshold even in a case that hopping boundaries of the long-PUCCH durations of five symbols and six symbols match, which can improve the characteristics of the long PUCCH of six symbols.

Figure 11:
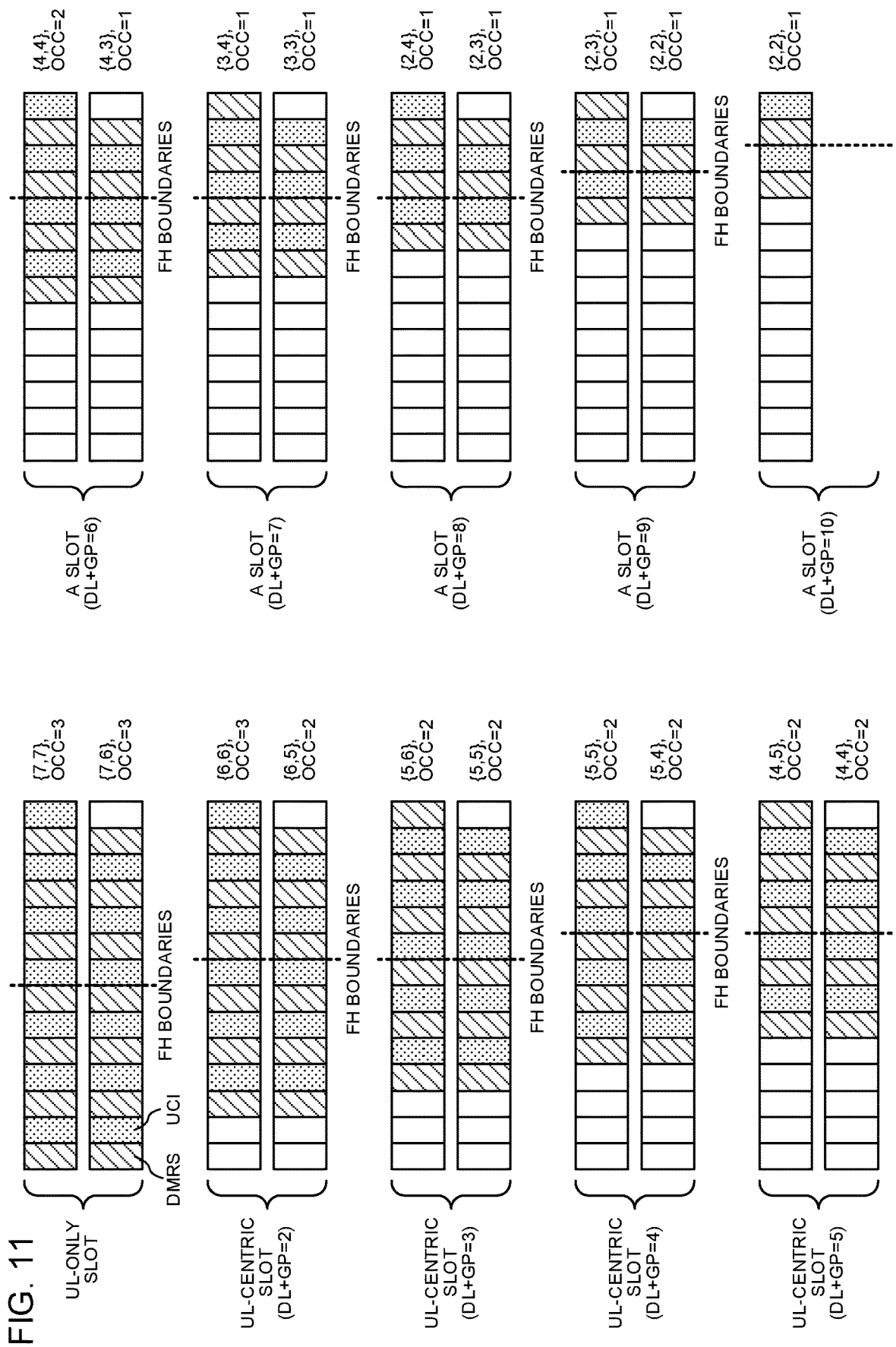
FIG. 11 is a diagram to show an example of a hopping boundary for each long-PUCCH duration according to the second aspect.

FIG. 11 is a diagram to show an example of a hopping boundary for each long-PUCCH duration according to the second aspect. FIG. 11 shows, for each PUCCH duration N, a hopping boundary determined by using the even-number table and the odd-number table shown in FIG. 10.

FIG. 12 is a diagram to show another example of the tables used for determination of a hopping boundary according to the second aspect. FIG. 12 is different from FIG. 10 in that the numbers of symbols (a, b) before and after hopping associated with a long-PUCCH duration of specific symbols (here, seven symbols and six symbols) in the odd-number table are configured to different values from those in the odd-number table shown in FIG. 10. Note that the even-number table shown in FIG. 12 is similar to the even-number table shown in FIG. 10.

Specifically, the numbers of symbols (a, b) before and after hopping associated with the long-PUCCH duration of seven symbols are (3, 4) in the odd-number table shown in FIG. 10 while being (2, 5) in the odd-number table shown in FIG. 10. The numbers of symbols (a, b) before and after hopping associated with the long-PUCCH duration of six symbols are (3, 3) in the odd-number table in FIG. 10 while being (2, 4) in the even-number table shown in FIG. 11.

When the numbers of symbols (a, b) before and after hopping associated with the long-PUCCH duration of six symbols are (3, 3), the ratio between UCI symbols and DMRS symbols after the hopping is lower than 50% (refer to DL+GP=7 in FIG. 11). In contrast, when the numbers of symbols (a, b) are (2, 4), the ratio between UCI symbols and DMRS symbols after the hopping is 50% as shown in FIG. 12.

As described above, according to the odd-number table shown in FIG. 12, the ratio between UCI symbols and DMRSs that are mapped to the same frequency resource in the long PUCCH of six symbols satisfies the certain threshold even in a case that hopping boundaries of the long-PUCCH durations of seven symbols and six symbols match, which can improve the characteristics of the long PUCCH of six symbols.

Note that the even-number table in FIG. 12 is the same as the even-number table in FIG. 10 but is not limited thereto, and the even-number table in FIG. 6 or the like may be used, for example.

FIG. 13 is a diagram to show still another example of the tables used for determination of a hopping boundary according to the second aspect. In the even-number table shown in FIG. 13, the numbers of symbols (a, b) before and after hopping associated with a long-PUCCH duration of specific symbols (here, 10 symbols and nine symbols in addition to six symbols and five symbols in FIG. 12) are configured to different values from those in the even-number table shown in FIG. 6.

In the odd-number table shown in FIG. 13, the numbers of symbols (a, b) before and after hopping associated with a long-PUCCH duration of specific symbols (here, 11 symbols and 10 symbols in addition to seven symbols and six symbols in FIG. 12) are configured to different values from those in the odd-number table shown in FIG. 6.

According to the even-number table shown in FIG. 13, the ratio between UCI symbols and DMRSs that are mapped to the same frequency resource in the long PUCCH of 10 symbols satisfies the certain threshold even in a case that hopping boundaries of the long-PUCCH durations of 10 symbols and nine symbols match, which can improve the characteristics of the long PUCCH of 10 symbols.

According to the odd-number table shown in FIG. 13, the ratio between UCI symbols and DMRS symbols that are mapped to the same frequency resource in the long PUCCH of 10 symbols satisfies the certain threshold even in a case that hopping boundaries of the long-PUCCH durations of 11 symbols and 10 symbols match, which can improve the characteristics of the long PUCCH of 10 symbols.

As described above, in the second aspect, hopping boundaries of a plurality of long PUCCHs in which the ratio between UCI symbols and DMRS symbols mapped to the same frequency resource satisfies a certain threshold and that have at least the same starting symbol, match in at least one long-PUCCH duration defined in an even-number table and/or an odd number table. Hence, it is possible to improve utilization efficiency of radio resources while improving characteristics of a long PUCCH of a specific long-PUCCH duration.

(Third Aspect)

Figure 5:
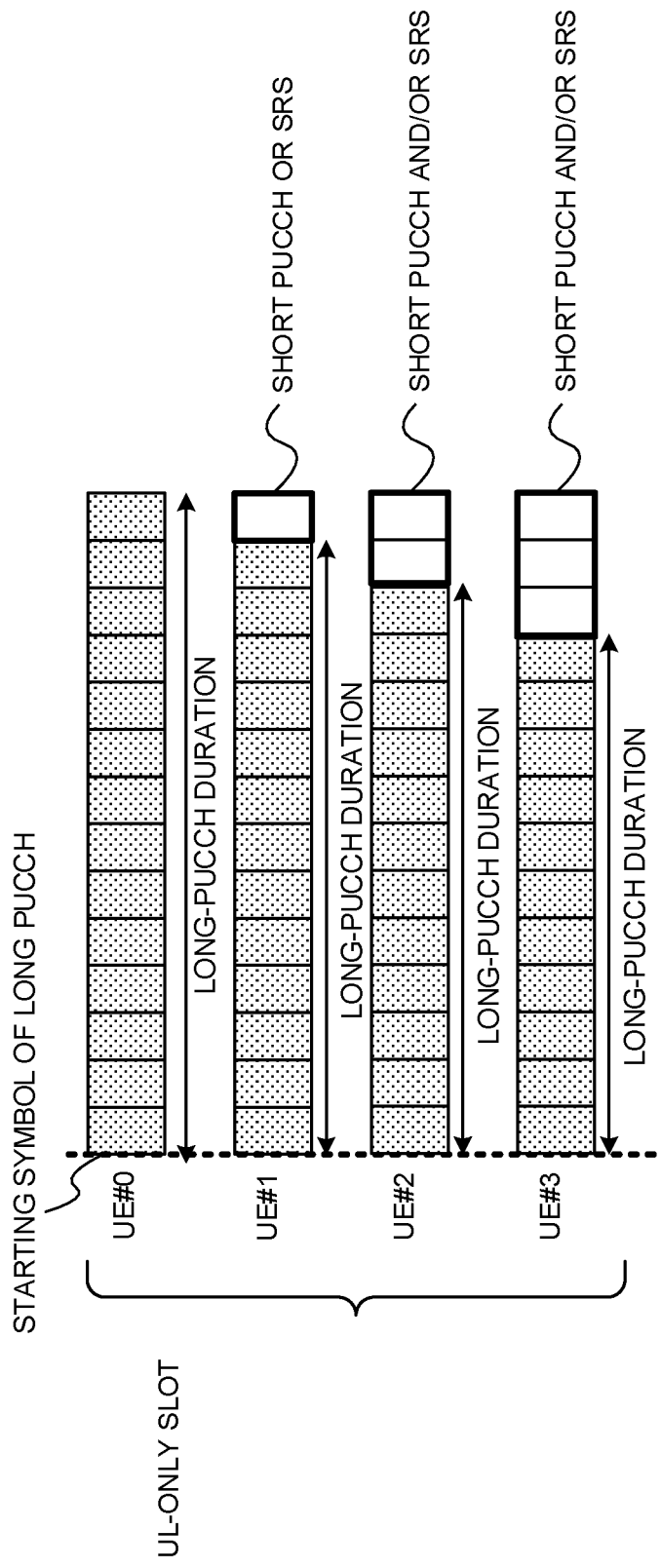
FIG. 5 is a diagram to show an example of a plurality of long PUCCHs having the same starting symbol and different long-PUCCH durations.

In a third aspect, variations of the case of using an even-number table and an odd-number table in the first and/or second aspects will be described. As illustrated in FIG. 5, it is assumed that a short PUCCH and/or an SRS is mapped to three symbols at maximum in the end of a slot. In the even-number table and/or the odd-number table described in the first and/or second aspects, hopping timings may not match among a plurality of long PUCCHs having different long-PUCCH durations by three symbols at maximum even though the plurality of long PUCCHs have starting symbols of the same index.

In view of this, in the third aspect, frequency hopping information (in other words, the numbers of symbols (a, b) before and after hopping) for each long-PUCCH duration is defined in an even-number table and an odd-number table, so that hopping timings match among a plurality of long PUCCHs having starting symbols of the same index even though the plurality of long PUCCHs have different long-PUCCH durations by three symbols at maximum.

FIG. 14 is a diagram to show an example of tables used for determination of a hopping boundary according to the third aspect. In an even-number table and an odd-number table shown in FIG. 14, the numbers of symbols (a, b) before and after hopping associated with each of long-PUCCH durations of 14 symbols and 13 symbols are configured to different values from those in FIG. 6 and the like. For example, the numbers of symbols (a, b) before and after hopping associated with the long-PUCCH duration of 14 symbols, 13 symbols are respectively (7, 7), (7, 6) in FIG. 6 and the like, for example, but are respectively defined as (6, 8), (6, 7) in FIG. 14.

According to the even-number table shown in FIG. 14, it is possible to match hopping boundaries even if long-PUCCH durations are different by three symbols at maximum in a case that long PUCCHs of a plurality of user terminals start at symbol #0 in an UL-only slot as shown in FIG. 15A. Hence, it is possible to improve utilization efficiency of radio resources.

According to the odd-number table shown in FIG. 14, it is possible to match hopping boundaries even if long-PUCCH durations are different by three symbols at maximum in a case that long PUCCHs of a plurality of user terminals start at symbol #3 in an UL-centric slot as shown in FIG. 15B. Hence, it is possible to improve utilization efficiency of radio resources.

Figure 16:
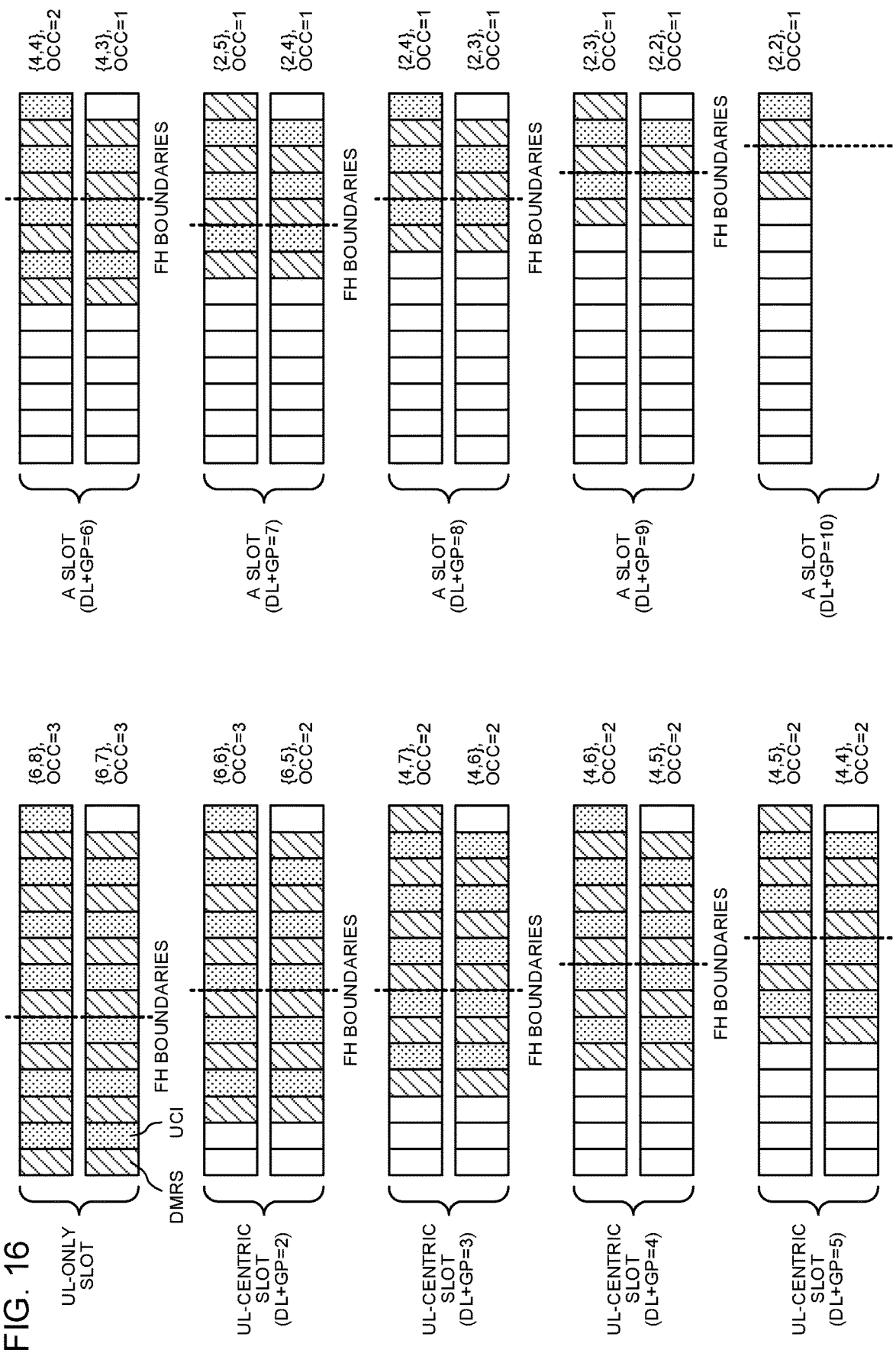
FIG. 16 is a diagram to show an example of a hopping boundary for each long-PUCCH duration according to the third aspect.

FIG. 16 is a diagram to show an example of a hopping boundary for each long-PUCCH duration according to the third aspect. FIG. 16 shows, for each PUCCH duration N, a hopping boundary determined by using the even-number table and the odd-number table shown in FIG. 14.

Note that the numbers of symbols before and after hopping associated with each of the long-PUCCH durations of symbols other than 14 symbols and 13 symbols in the even-number table and the odd-number table shown in FIG. 14 are the same as those in FIG. 13, but are not limited thereto.

In FIG. 14, although the even-number table and the odd-number table are different from each other in frequency hopping information (the numbers of symbols (a, b) before and after hopping) only in the cases that the long-PUCCH durations are 11 symbols and 7 symbols but are the same in other cases than those where the long-PUCCH durations are 11 symbols and seven symbols. For this reason, although the even-number table and the odd-number table are provided separately above, it may be possible, in a case that only a single table (for example, the odd-number table in FIG. 14) is used and a specific condition is satisfied, frequency hopping information in the single table may be replaced.

For example, in a case (1) that a long-PUCCH duration is 11 symbols or 7 symbols and the index of the starting symbol is an even number, the numbers of symbols (4, 7) or (2, 5) before and after hopping in a long PUCCH of 11 symbols or seven symbols in the single table (for example, the odd-number table in FIG. 14) may be replaced with (6, 5) or (4, 3).

Alternatively, in a case (2) that a long-PUCCH duration is 11 symbols and the index of the starting symbol is #2, the numbers of symbols (4, 7) before and after hopping in a long PUCCH of 11 symbols in the single table (for example, the odd-number table in FIG. 14) may be replaced with (6, 5). Similarly, in a case that a long-PUCCH duration is 11 symbols and the index of the starting symbol is #6, the numbers of symbols (2, 5) before and after hopping in a long PUCCH of seven symbols in the single table (for example, the odd-number table in FIG. 14) may be replaced with (4, 3).

Since the size of table can be reduced (the kinds of hopping boundary can be reduced) in the case of using the single table without providing an even-number table and an odd-number table separately as described above, operations (or tests) in user terminals can be simplified. In particular, in a case of using index values of starting symbols instead of whether each starting symbol is an even number or an odd number, the number of test patterns for user terminals is reduced (for example, both of starting symbols #0 and #2 are assumed in a case of a long-PUCCH duration of 11 symbols), and hence operations (tests) in the user terminals can be simplified.

(Other Aspects)

In the above-described first to third aspects, symbol indices in each slot is assumed to start from #0 but is not limited thereto. For example, the present embodiment is also appropriately applicable to a case that a symbol index in each slot starts from #1, by exchanging the values in an even-umber table and the values in an odd-number table with each other, for example.

In the above-described first to third aspects, a case where the number of symbols in each slot is 14 as an example, but the number of symbols in a slot is not limited thereto. The present embodiment is also appropriately applicable to a case where the number of symbols is other than 14.

(Radio Communication System)

Hereinafter, a structure of a radio communication system according to the present embodiment will be described. In this radio communication system, the radio communication methods according to the above-described aspects are employed. Note that the radio communication methods according to the above-described aspects may be employed independently or may be employed by combining at least two of the radio communication methods.

Figure 17:
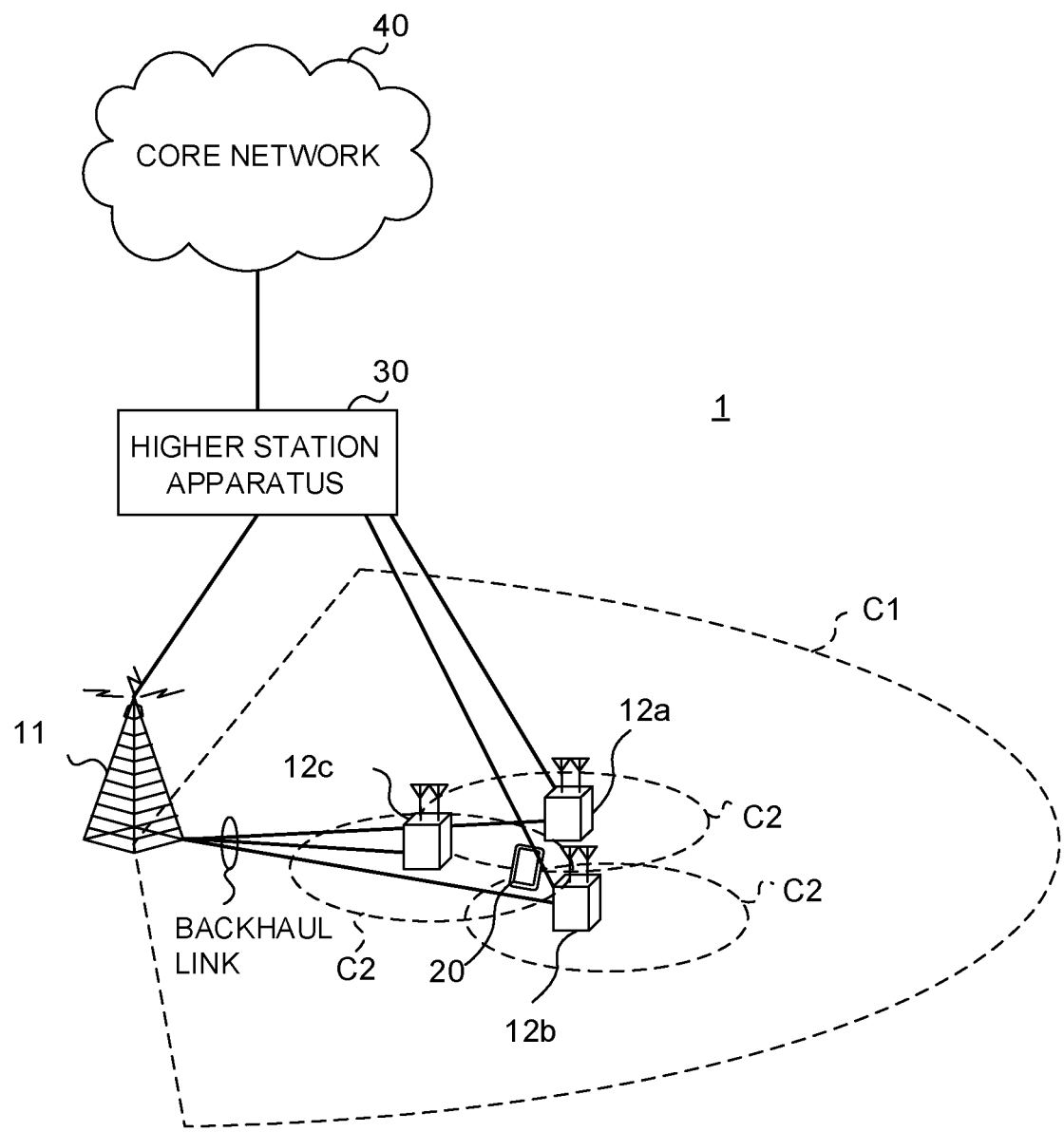
FIG. 17 is a diagram to show an example of a schematic structure of a radio communication system according to the present embodiment.

FIG. 17 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 17 is provided with a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells and/or within a cell may be adopted.

Here, "numerology" refers to communication parameters in the frequency direction and/or the time direction (for example, at least one of the subcarrier spacing (subcarrier interval), the bandwidth, the symbol length, the time length of CPs (CP length), the subframe length, the time length of TTIs (TTI length), the number of symbols per TTI, the radio frame structure, the filtering process, the windowing process, and so on). The radio communication system 1 may support subcarrier spacings of 15 kHz, 30 kHz, 60 kHz, 120 kHz, 240 kHz, and so on, for example.

The user terminals 20 can connect with both the radio base station 11 and the radio base stations 12. The user terminals 20 may use the macro cell C1 and the small cells C2, which use different frequencies, at the same time by means of CA or DC. Also, the user terminals 20 can execute CA or DC by using a plurality of cells (CCs) (for example, two or more CCs). Furthermore, the user terminals can use licensed band CCs and unlicensed band CCs as a plurality of cells.

Furthermore, the user terminal 20 can perform communication using time division duplex (TDD) or frequency division duplex (FDD) in each cell. A TDD cell and an FDD cell may be referred to as a "TDD carrier (frame structure type 2)" and an "FDD carrier (frame structure type 1)," respectively, for example.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," a "legacy carrier," and so on). Meanwhile, between the user terminals 20 and the radio base stations 12, a carrier of a relatively high frequency band (for example, 3.5 GHz, 5 GHz, 30 to 70 GHz, and so on) and a wide bandwidth may be used, or the same carrier as that used with the radio base station 11 may be used. Note that the structure of the frequency band for use in each radio base station is by no means limited to these.

A structure may be employed in which wired connection (for example, an optical fiber in compliance with the CPRI (Common Public Radio Interface), an X2 interface, and so on) or wireless connection is established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)," and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points," and so on. Hereinafter, the radio base stations 11 and 12 will be collectively referred to as "radio base stations 10," unless specified otherwise.

The user terminals 20 are terminals to support various communication schemes such as LTE, LTE-A, 5G, NR, and so on, and may include not only mobile communication terminals but also stationary communication terminals. Furthermore, the user terminals 20 can perform device-to-device (D2D) communication with other user terminals 20.

In the radio communication system 1, as radio access schemes, OFDMA (Orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Furthermore, in the radio communication system 1, a multi-carrier waveform (for example, an OFDM waveform) may be used, or a single-carrier waveform (for example, a DFT-s-OFDM waveform) may be used.

In the radio communication system 1, a DL shared channel (PDSCH (Physical Downlink Shared Channel), which is also referred to as a "DL data channel" and so on), which is used by each user terminal 20 on a shared basis, a broadcast channel (PBCH (Physical Broadcast Channel)), L1/L2 control channels, and so on, are used as downlink (DL) channels. User data, higher layer control information, SIBs (System Information Blocks), and so on are communicated in the PDSCH. Also, MIBs (Master Information Blocks) are communicated in the PBCH.

The L1/L2 control channels include downlink control channels (a PDCCH (Physical Downlink Control Channel) and an EPDCCH (Enhanced Physical Downlink Control Channel)), a PCFICH (Physical Control Format Indicator Channel), a PHICH (Physical Hybrid-ARQ Indicator Channel), and so on. Downlink control information (DCI) including PDSCH and PUSCH scheduling information is communicated in the PDCCH, for example. The number of OFDM symbols to use for the PDCCH is communicated in the PCFICH. The EPDCCH is frequency-division-multiplexed with the PDSCH and used to communicate DCI and so on, like the PDCCH. HARQ retransmission control information (ACK/NACK) in response to the PUSCH can be communicated in at least one of the PHICH, the PDCCH, and the EPDCCH.

In the radio communication system 1, an uplink (UL) shared channel (PUSCH (Physical Uplink Shared Channel, also referred to as an "uplink data channel" and so on)), which is used by each user terminal 20 on a shared basis, an uplink control channel (PUCCH (Physical Uplink Control Channel)), a random access channel (PRACH (Physical Random Access Channel)), and so on are used as uplink (UL) channels. User data and higher layer control information are communicated in the PUSCH. Uplink control information (UCI) including at least one of downlink (DL) signal retransmission control information (A/N), channel state information (CSI), and so on, is communicated in the PUSCH or the PUCCH. By means of the PRACH, random access preambles for establishing connections with cells can be communicated.

<Radio Base Station>

Figure 18:
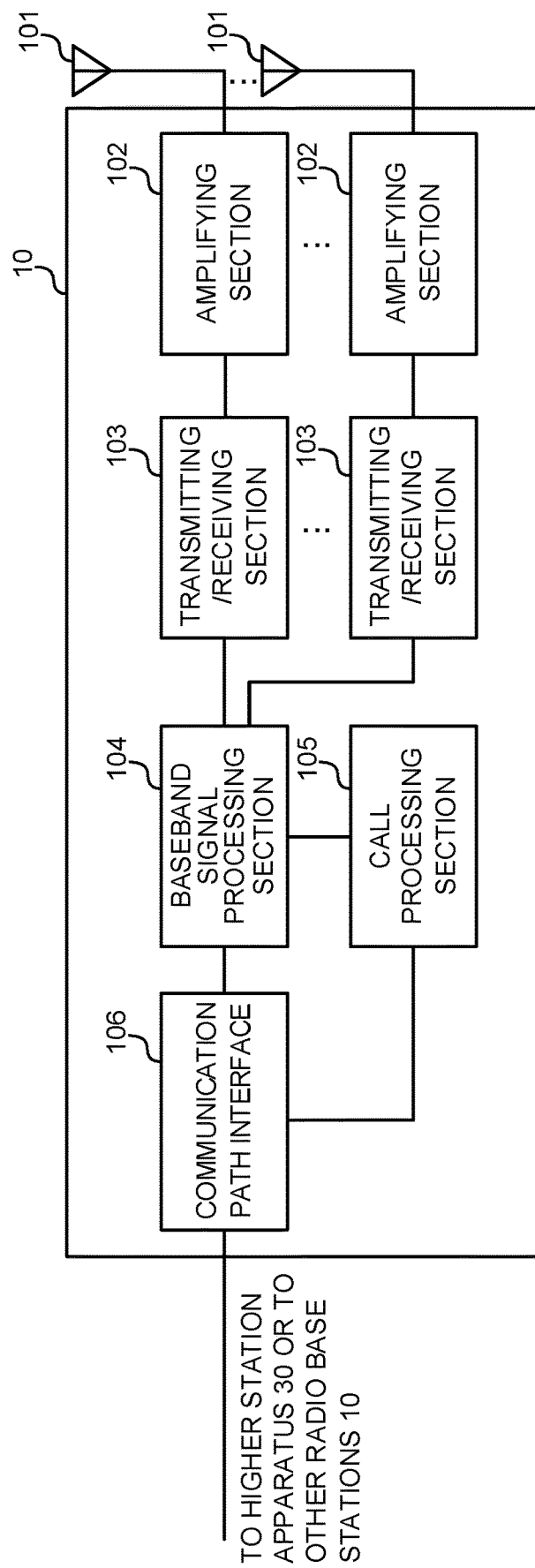
FIG. 18 is a diagram to show an example of an overall structure of a radio base station according to the present embodiment.

FIG. 18 is a diagram to show an example of an overall structure of the radio base station according to the present embodiment. A radio base station 10 is provided with a plurality of transmitting/receiving antennas 101, amplifying sections 102, transmitting/receiving sections 103, a baseband signal processing section 104, a call processing section 105, and a transmission line interface 106. Note that the radio base station 10 may be configured to include one or more transmitting/receiving antennas 101, one or more amplifying sections 102, and one or more transmitting/receiving sections 103.

User data to be transmitted from the radio base station 10 to a user terminal 20 on the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted with transmitters/receivers, transmitting/receiving circuits, or pieces of transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink (UL) signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 converts the received signals into the baseband signal through frequency conversion and outputs to the baseband signal processing section 104.

In the baseband signal processing section 104, UL data that is included in the input UL signals is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing, such as setting up and releasing communication channels, manages the state of the radio base station 10, and manages the radio resources.

The communication path interface 106 transmits and/or receives signals to and/or from the higher station apparatus 30 via a certain interface. Also, the transmission line interface 106 may transmit and/or receive signals (backhaul signaling) with neighboring radio base stations 10 via an inter-base station interface (for example, an optical fiber in compliance with the CPRI (Common Public Radio Interface) and an X2 interface).

Also, the transmitting/receiving sections 103 transmit downlink (DL) signals (including at least one of DL data signals, DL control signals, and DL reference signals) to the user terminals 20, and receive uplink (UL) signals (including at least one of UL data signals, UL control signals, and UL reference signals) from the user terminals 20.

The transmitting/receiving sections 103 receive UCI from the user terminals 20 on uplink data channels (for example, PUSCHs) or uplink control channels (for example, short PUCCHs and/or long PUCCHs). The UCI may include at least one of an HARQ-ACK for a downlink data channel (for example, a PDSCH), CSI, an SR, beam identification information (for example, a beam index (BI)), and a buffer status report (BSR).

Also, the transmitting/receiving sections 103 transmit control information (higher layer control information) through higher layer signaling and downlink control information (DCI) through physical layer signaling. Specifically, the transmitting/receiving sections 103 may transmit at least one of configuration information indicating a PUCCH resource, information indicating a PUCCH format and/or duration, and information indicating a starting position (starting symbol) of a long PUCCH, through physical layer signaling (L1 signaling) and/or higher layer signaling.

Figure 19:
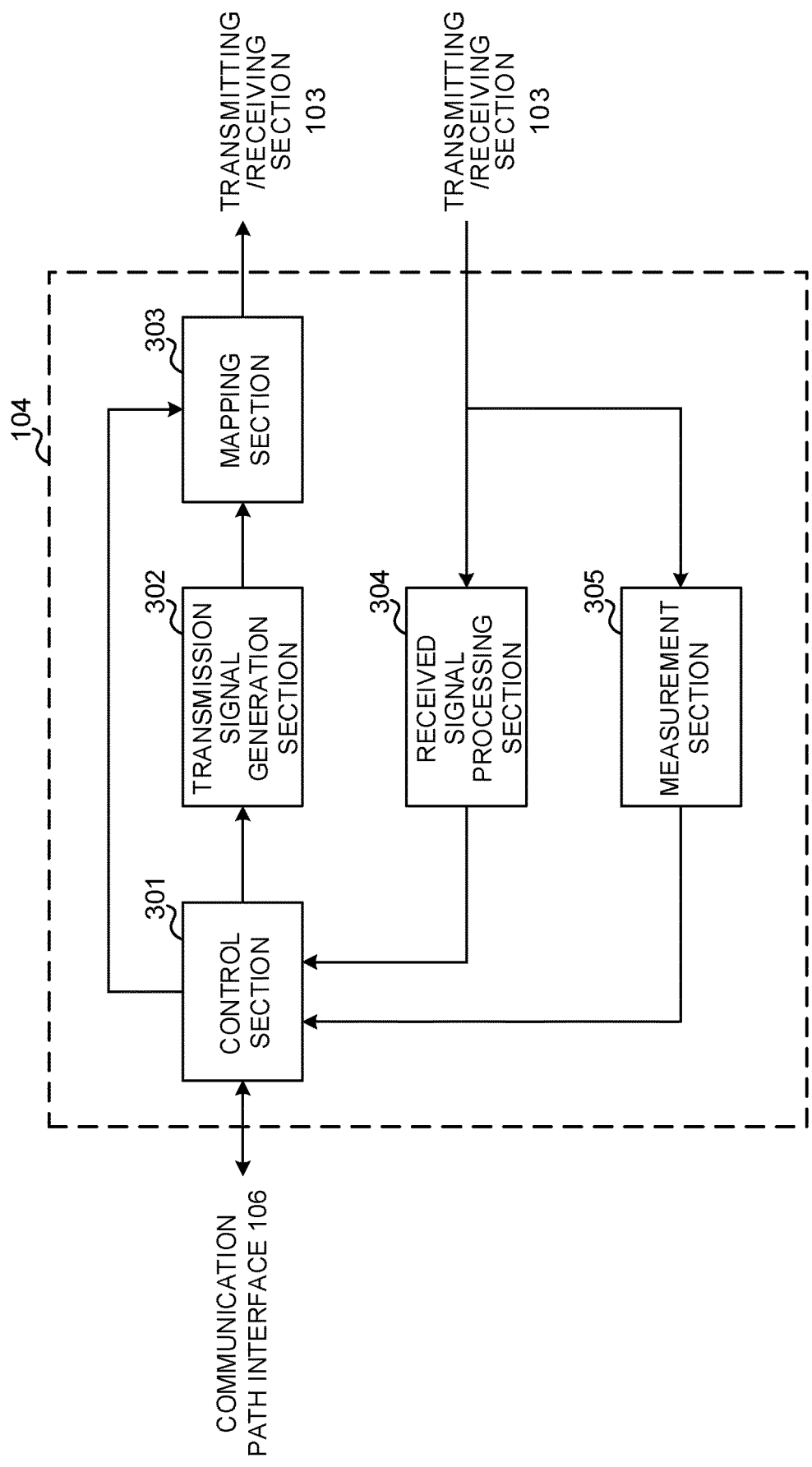
FIG. 19 is a diagram to show an example of a functional structure of the radio base station according to the present embodiment.

FIG. 19 is a diagram to show an example of a functional structure of a radio base station according to the present embodiment. Note that, although FIG. 19 primarily shows functional blocks that pertain to characteristic parts of the present embodiment, the radio base station 10 includes other functional blocks that are necessary for radio communication as well. As shown in FIG. 19, the baseband signal processing section 104 is provided with a control section 301, a transmission signal generation section 302, a mapping section 303, a received signal processing section 304, and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304, and the measurements by the measurement section 305.

To be more specific, the control section 301 performs scheduling for the user terminals 20. Specifically, the control section 301 may perform scheduling and/or retransmission control of the downlink data channel and/or uplink data channel, based on UCI (for example, CSI and/or BI) from the user terminals 20.

Furthermore, the control section 301 may control a structure (format) of an uplink control channel (for example, a long PUCCH and/or a short PUCCH) and perform control to transmit control information related to the uplink control channel.

The control section 301 may control a hopping timing (a hopping boundary) for a frequency resource to which an uplink control channel (for example, a long PUCCH) is mapped, based on whether the index of the starting symbol of the uplink control channel is an even number or an odd number and the duration of the uplink control channel.

Specifically, the control section 301 may control the hopping timing by using different tables (for example, the even-number table and the odd-number table shown in each of FIGS. 7, 10, 12, 13, and 14, and the like) or mathematical expressions (for example, Expressions 1 or 2 described above) for each of a case where the index of the starting symbol of the uplink control channel (for example, a long PUCCH) is an even number and a case where the index is an odd number.

Also, the control section 301 may control PUCCH resources.

The control section 301 may control the received signal processing section 304 to perform a receiving process of UCI from the user terminals 20, based on the uplink control channel format.

The control section 301 can be constituted with a controller, a control circuit, or control apparatus that can be described based on general understanding of the technical field to which the present invention pertains.

The transmission signal generation section 302 generates DL signals (including DL data signals, DL control signals, and DL reference signals), based on commands from the control section 301 and outputs the DL signals to the mapping section 303.

The transmission signal generation section 302 may be a signal generator, a signal generation circuit, or signal generation apparatus that can be described based on general understanding of the technical field to which the present invention pertains.

The mapping section 303 maps the DL signals generated in the transmission signal generation section 302 to certain radio resources, based on commands from the control section 301, and outputs these to the transmitting/receiving sections 103. The mapping section 303 may be a mapper, a mapping circuit, or mapping apparatus that can be described based on general understanding of the technical field to which the present invention pertains.

The received signal processing section 304 performs the receiving process (for example, demapping, demodulation, decoding, and so on) of UL signals (including, for example, UL data signals, UL control signals, and UL reference signals) that are transmitted from the user terminals 20. Specifically, the received signal processing section 304 may output the received signals, the signals after the receiving process, and so on, to the measurement section 305. Furthermore, the received signal processing section 304 performs the receiving process of UCI, based on the uplink control channel structures according to commands from the control section 301.

The measurement section 305 conducts measurements with respect to the received signals. The measurement section 305 can be constituted with a measurer, a measurement circuit, or measurement apparatus that can be described based on general understanding of the technical field to which the present invention pertains.

The measurement section 305 may measure the channel quality in UL, based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 20:
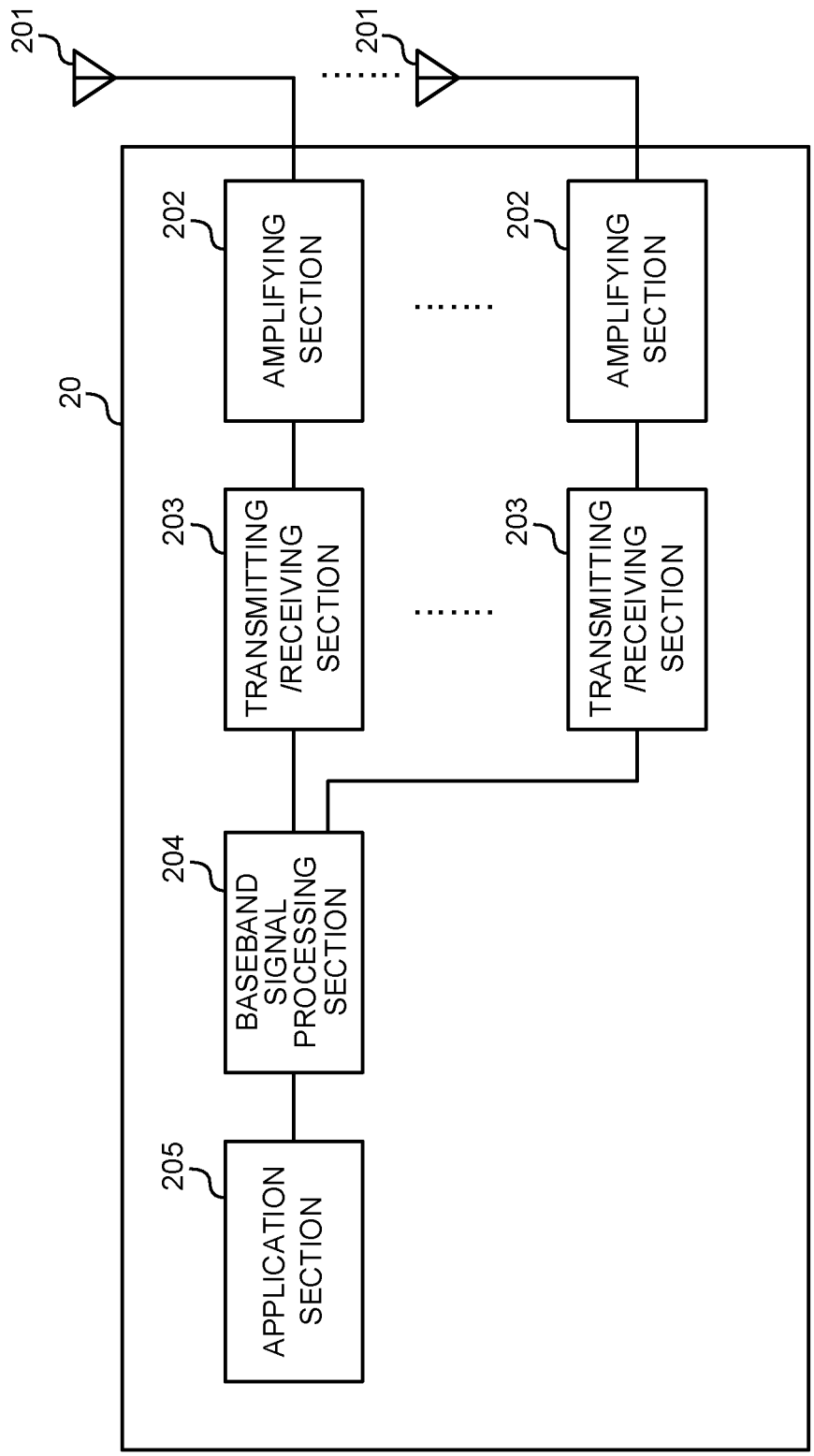
FIG. 20 is a diagram to show an example of an overall structure of a user terminal according to the present embodiment.

FIG. 20 is a diagram to show an example of an overall structure of a user terminal according to the present embodiment. Each user terminal 20 is provided with a plurality of transmitting/receiving antennas 201 for MIMO communication, amplifying sections 202, transmitting/receiving sections 203, a baseband signal processing section 204, and an application section 205.

Radio frequency signals that are received in the plurality of transmitting/receiving antennas 201 are amplified in the amplifying sections 202. The transmitting/receiving sections 203 receive DL signals amplified in the amplifying sections 202. The transmitting/receiving sections 203 convert the received signals into baseband signals through frequency conversion, and output the baseband signals to the baseband signal processing section 204.

The baseband signal processing section 204 performs, on each input baseband signal, an FFT process, error correction decoding, a retransmission control receiving process, and so on. The DL data is forwarded to the application section 205. The application section 205 performs processes related to higher layers above the physical layer and the MAC layer, and so on. Broadcast information is also forwarded to the application section 205.

Meanwhile, the uplink (UL) data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process, and so on, and the result is forwarded to each transmitting/receiving section 203. On UCI, at least one of channel coding, rate matching, puncturing, a DFT process, and an IFFT process is performed, and the result is transferred to each transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Furthermore, the transmitting/receiving sections 203 receive the downlink (DL) signals (including DL data signals, DL control signals, and DL reference signals) of the numerology configured in the user terminals 20, and transmit the UL signals (including UL data signals, UL control signals, and UL reference signals) of the numerology.

The transmitting/receiving sections 203 transmit UCI to the radio base station 10 on uplink data channels (for example, PUSCHs) or uplink control channels (for example, short PUCCHs and/or long PUCCHs).

Furthermore, the transmitting/receiving sections 203 receive control information (higher layer control information) through higher layer signaling and downlink control information (DCI) through physical layer signaling. Specifically, the transmitting/receiving sections 203 may receive at least one of configuration information indicating a PUCCH resource, information indicating a PUCCH format and/or duration, and information indicating a starting position (starting symbol) of a long PUCCH, through physical layer signaling (L1 signaling) and/or higher layer signaling.

The transmitting/receiving sections 203 may be transmitters/receivers, transmitting/receiving circuits, or pieces of transmitting/receiving apparatus that can be described based on general understanding of the technical field to which the present invention pertains. In addition, each transmitting/receiving section 203 may be structured as a transmitting/receiving section in one entity, or may be constituted with a transmitting section and a receiving section.

Figure 21:
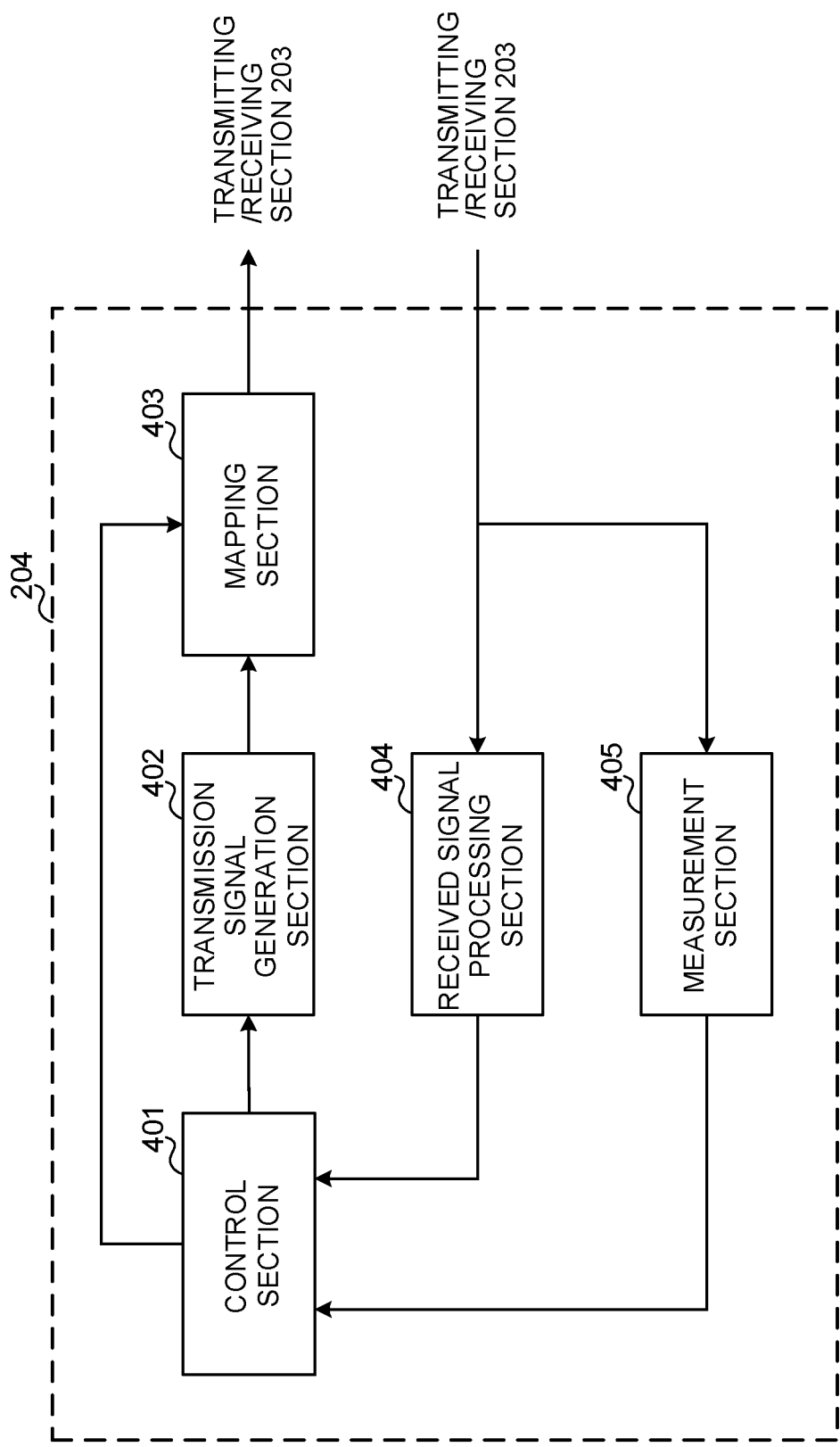
FIG. 21 is a diagram to show an example of a functional structure of the user terminal according to the present embodiment.

FIG. 21 is a diagram to show an example of a functional structure of a user terminal according to the present embodiment. Note that, although FIG. 21 primarily shows functional blocks that pertain to characteristic parts of the present embodiment, the user terminal 20 includes other functional blocks that are necessary for radio communication as well. As shown in FIG. 21, the baseband signal processing section 204 included in the user terminal 20 is provided with a control section 401, a transmission signal generation section 402, a mapping section 403, a received signal processing section 404, and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405, and so on.

Furthermore, the control section 401 controls an uplink control channel used for transmission of UCI from the user terminal 20, based on an explicit command from the radio base station 10 or an implicit determination in the user terminal 20.

Furthermore, the control section 401 may control a structure (format) of an uplink control channel (for example, a long PUCCH and/or a short PUCCH). The control section 401 may control the uplink control channel format, based on the control information from the radio base station 10.

The control section 401 may control a hopping timing (a hopping boundary) for a frequency resource to which an uplink control channel (for example, a long PUCCH) is mapped, based on whether the index of the starting symbol of the uplink control channel is an even number or an odd number and the duration of the uplink control channel.

Specifically, the control section 401 may control the hopping timing by using different tables (for example, the even-number table and the odd-number table shown in each of FIGS. 7, 10, 12, 13, and 14, and the like) or mathematical expressions (for example, Expressions 1 or 2 described above) for each of a case where the index of the starting symbol of the uplink control channel (for example, a long PUCCH) is an even number and a case where the index is an odd number.

In each of the even-number table and the odd-number table described above, a hopping timing may be defined for each of durations of a plurality of uplink control channels, to match hopping timings of a plurality of control channels with each other, the plurality of uplink control channels having starting symbols of the same index and different durations by the certain number of symbols.

In the even-number table and/or the odd-number table described above, a hopping timing in an uplink control channel of a specific duration may be defined based on a ratio between UCI and a demodulation reference signal that are mapped to the same frequency resource.

In the even-number table and/or the odd-number table described above, instead of information indicating that the index of a starting symbol of an uplink control channel of the specific duration is an even number, the index may be associated with a hopping timing of the specific duration.

Furthermore, the control section 401 may determine PUCCH resources to be used in a PUCCH format, based on higher layer signaling and/or downlink control information.

The control section 401 may control at least one of the transmission signal generation section 402, the mapping section 403, and the transmitting/receiving sections 203 to perform a transmission process of UCI, based on the PUCCH format.

The control section 401 can be constituted with a controller, a control circuit, or control apparatus that can be described based on general understanding of the technical field to which the present invention pertains.

The transmission signal generation section 402 generates (for example, through coding, rate matching, puncturing, modulation, and so on) UL signals (including UL data signals, UL control signals, UL reference signals, and UCI), based on commands from the control section 401 and outputs these signals to the mapping section 403. The transmission signal generation section 402 may be a signal generator, a signal generation circuit, or signal generation apparatus that can be described based on general understanding of the technical field to which the present invention pertains.

The mapping section 403 maps the UL signals generated in the transmission signal generation section 402 to radio resources, based on commands from the control section 401, and outputs these to the transmitting/receiving sections 203. The mapping section 403 may be a mapper, a mapping circuit, or mapping apparatus that can be described based on general understanding of the technical field to which the present invention pertains.

The received signal processing section 404 performs a receiving process (for example, demapping, demodulation, decoding, and so on) on DL signals (DL data signals, scheduling information, DL control signals, and DL reference signals). The received signal processing section 404 outputs information received from the radio base station 10, to the control section 401. The received signal processing section 404 outputs, for example, broadcast information, system information, higher layer control information through higher layer signaling such as RRC signaling, physical layer control information (L1/L2 control information), and so on, to the control section 401.

The received signal processing section 404 can be constituted with a signal processor, a signal processing circuit, or signal processing apparatus that can be described based on general understanding of the technical field to which the present invention pertains. Also, the received signal processing section 404 can constitute a receiving section according to the present invention.

The measurement section 405 measures channel states, based on reference signals (for example, CSI-RSs) from the radio base station 10, and outputs the measurement results to the control section 401. Note that the channel state measurements may be conducted per CC.

The measurement section 405 can be constituted with a signal processor, a signal processing circuit, or signal processing apparatus, and a measurer, a measurement circuit, or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 22:
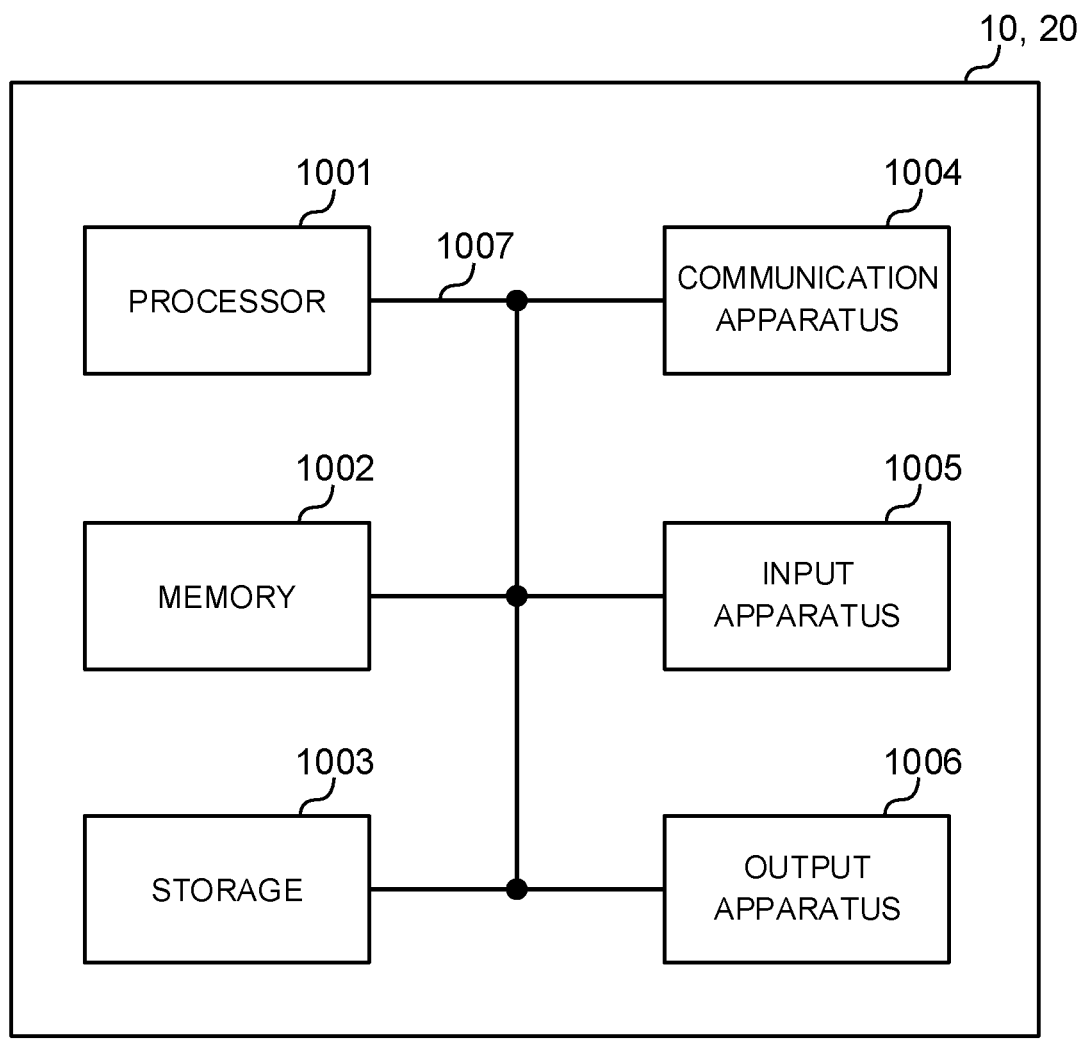
FIG. 22 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 22 is a diagram to show an example of a hardware structure of a radio base station and a user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (read only memory), an EPROM (erasable programmable ROM), an EEPROM (electrically EPROM), a RAM (random access memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal", and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein may be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "transmission reception point," "femto cell," "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

A base station and/or mobile station may be also referred to as "transmission apparatus," "reception apparatus," and so on.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal comprising:
   a transmitter that transmits uplink control information (UCI) by using an uplink control channel; and
   a processor that controls a hopping timing of a frequency resource to which the uplink control channel is mapped, based on whether an index of a starting symbol of the uplink control channel is an even number or an odd number and a duration of the uplink control channel,
   wherein the processor controls the hopping timing by using different respective tables for when the index is an even number and for when the index is an odd number,
   in the table for when the index is an even number, a number of symbols before hopping is greater than or equal to a number of symbols after hopping, and
   in the table for when the index is an odd number, a number of symbols before hopping is less than or equal to a number of symbols after hopping,
   wherein the processor performs a control so that hopping timings match each other among a plurality of uplink control channels having starting symbols of a same index and having different durations by a given number of symbols, and
   wherein in an uplink control channel, of the plurality of uplink control channels, that has a duration of even symbols and an orthogonal cover code (OCC), multiplexing capacity thereof is 2 or more, a ratio between UCI symbols and demodulation reference signal (DMRS) symbols after frequency hopping is 50%, and numbers of symbols before and after frequency hopping for each uplink control channel of the even symbols are different.

2. The terminal according to claim 1, wherein
   in at least one of the tables, instead of information indicating that an index of a starting symbol of an uplink control channel of a specific duration is an even number, the index is associated with a hopping timing of the specific duration.

3. A radio communication method comprising:
   in a terminal,
   transmitting uplink control information (UCI) by using an uplink control channel;
   controlling a hopping timing of a frequency resource to which the uplink control channel is mapped, based on whether an index of a starting symbol of the uplink control channel is an even number or an odd number and a duration of the uplink control channel;
   controlling the hopping timing by using different respective tables for when the index is an even number and for when the index is an odd number,
   wherein in the table for when the index is an even number, a number of symbols before hopping is greater than or equal to a number of symbols after hopping, and
   in the table for when the index is an odd number, a number of symbols before hopping is less than or equal to a number of symbols after hopping; and
   performing a control so that hopping timings match each other among a plurality of uplink control channels having starting symbols of a same index and having different durations by a given number of symbols,
   wherein in an uplink control channel, of the plurality of uplink control channels, that has a duration of even symbols and an orthogonal cover code (OCC), multiplexing capacity thereof is 2 or more, a ratio between UCI symbols and demodulation reference signal (DMRS) symbols after frequency hopping is 50%, and numbers of symbols before and after frequency hopping for each uplink control channel of the even symbols are different.

* * * * *